US007992403B2

(12) United States Patent
Kim et al.

(10) Patent No.: US 7,992,403 B2
(45) Date of Patent: Aug. 9, 2011

(54) AIR CONDITIONING SYSTEM USING GROUND HEAT

(75) Inventors: In Kyu Kim, Jinhae-si (KR); Jung Hoon Kim, Changwon-si (KR); Jae Yoon Koh, Seoul (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 11/785,901

(22) Filed: Apr. 20, 2007

(65) Prior Publication Data

US 2008/0016895 A1 Jan. 24, 2008

(30) Foreign Application Priority Data

May 19, 2006 (KR) .................. 10-2006-0045353

(51) Int. Cl.
 *F25D 23/12* (2006.01)
(52) U.S. Cl. .............. 62/260; 62/238.1; 62/510; 165/45
(58) Field of Classification Search .............. 62/260, 62/238.1, 238.6, 510; 165/45
See application file for complete search history.

(56) References Cited

U.S. PATENT DOCUMENTS

| 4,257,239 A * | 3/1981 | Partin et al. .................. 62/238.7 |
| 4,920,757 A | 5/1990 | Gazes et al. |
| 5,081,848 A * | 1/1992 | Rawlings et al. ............... 62/260 |
| 5,152,153 A * | 10/1992 | Hsiao .............................. 62/260 |
| 6,167,715 B1 | 1/2001 | Hebert |
| 2003/0230100 A1 * | 12/2003 | Hwang ........................... 62/184 |
| 2004/0000159 A1 * | 1/2004 | Xu ................................... 62/260 |
| 2005/0005619 A1 | 1/2005 | Kojima et al. |
| 2006/0075775 A1 * | 4/2006 | Boiarski et al. .................. 62/612 |
| 2006/0288724 A1 * | 12/2006 | Ambs et al. ..................... 62/260 |

FOREIGN PATENT DOCUMENTS

| CN | 1082694 A | 2/1994 |
| CN | 1366162 A | 8/2002 |
| JP | 2003-279133 | 10/2003 |
| WO | WO 2006/045227 A1 | 5/2006 |

* cited by examiner

*Primary Examiner* — Cheryl J Tyler
*Assistant Examiner* — Jonathan Koagel
(74) *Attorney, Agent, or Firm* — McKenna Long & Aldridge LLP

(57) ABSTRACT

Provided is an air conditioning system using ground heat. The system includes one or more indoor units, at least one outdoor unit, a ground heat exchanger, and a plurality of auxiliary heat sources. The one or more indoor units condition indoor air. The at least one outdoor unit communicates with the indoor units via a plurality of pipes, and includes an outdoor heat exchanger where heat exchange occurs. The ground heat exchanger is connected with the outdoor heat exchanger of the outdoor unit, and laid under the ground to allow heat to be exchanged between ground heat and a circulating medium circulating through the ground heat exchanger. The plurality of auxiliary heat sources are installed on one side of the outdoor unit to assist heat exchange of the outdoor heat exchanger. Two or more auxiliary heat sources are simultaneously used, or one of them is selectively used.

11 Claims, 13 Drawing Sheets

AIR CONDITIONING SYSTEM USING GROUND HEAT

This application claims the benefit of Korean Patent Application No. 10-2006-0045353 filed on May 19, 2006, which is hereby incorporated by reference for all purposes as if fully set forth herein.

BACKGROUND OF THE INVENTION

1. Field of the Invention

The present invention relates to an air conditioning system using ground heat, and more particularly, to an air conditioning system performing heat exchange using ground heat, and including an auxiliary heat source that can be selectively used to assist heat exchange.

2. Description of the Related Art

Generally, an air conditioning system called an air conditioner a cooling/heating system for cooling an indoor space through repetition of sucking warm indoor air, exchanging heat with coolant of low temperature, and discharging the indoor space, or for heating the indoor space through a reverse operation. The air conditioning system provides a series of cycles of a compressor-condenser-expansion valve-evaporator.

Also, recently, the air conditioning system also provides an air conditioning function of sucking and filtering polluted air of the indoor space, purifying the polluted air into clean air, and supplying the clean air back to the indoor space, and a variety of additional functions such as a dehumidifying function of changing humid air into dry air and supplying the dry air back to the indoor space.

Meanwhile, as is generally known in the art, an air conditioner is roughly classified into a separation type air conditioner where an outdoor unit and an indoor unit are separately installed, and an integral type air conditioner where the outdoor unit and the indoor unit are integrally installed.

Also, recently, a multi-type air conditioner is brought to the market. The multi-type air conditioner can be effectively used in the case where two or more air conditioners are installed in home, or air conditioners are installed at respective offices of a building having a plurality of offices. The multi-type air conditioner can achieve an effect as if a plurality of separation type air conditioners were installed by connecting a plurality of indoor units to a single outdoor unit.

However, a related art air conditioner maintains an indoor space at an appropriate state through a heat exchange operation between coolant of the inside of the air conditioner and outside air. Therefore, temperature of outside air is too low during a heating cycle, and too high during a cooling cycle in a heat exchange system using the air.

Therefore, great energy is consumed in absorbing and exhausting heat from coolant. When temperature of outside air is not constant, it is difficult to stably operate a cooling cycle and a heating cycle due to abnormality of a heat source required for the heating/cooling cycles.

Meanwhile, to solve problems of a heat exchange system using outside air, there recently emerges a basic air conditioning system performing outside heat exchange using ground heat as a heat source. Therefore, since the air conditioning system using the ground heat exchanges heat using ground heat as a heat source without an influence caused by temperature of outside air, it provides higher thermal efficiency (co-efficient-of-performance (COP) and energy efficiency ratio (EER)) than that of an air conditioning system using air.

However, an air conditioning system using ground heat has lots of problems. That is, despite advantages such as thermal efficiency improvement, the air conditioning system using ground heat still has a problem that stability and reliability of cooling/heating cycles decreases when coolant that has flowed through an outdoor heat exchanger after it exchanges heat in an indoor space does not sufficiently exhaust/absorb heat to/from the ground during cooling/heating cycles.

SUMMARY OF THE INVENTION

Accordingly, the present invention is directed to an air conditioning system using ground heat that substantially obviates one or more problems due to limitations and disadvantages of the related art.

An object of the present invention is to provide an air conditioning system exchanging heat using ground heat and including an auxiliary heat source that can be selectively used to assist heat exchange.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an air conditioning system using ground heat, the system including: one or more indoor units for conditioning indoor air; at least one outdoor unit communicating with the indoor units via a plurality of pipes, and including an outdoor heat exchanger where heat exchange occurs; a ground heat exchanger connected with the outdoor heat exchanger of the outdoor unit, and laid under the ground to allow heat to be exchanged between ground heat and a circulating medium circulating through the ground heat exchanger; and a plurality of auxiliary heat sources installed on one side of the outdoor unit to assist heat exchange of the outdoor heat exchanger, wherein two or more auxiliary heat sources of the plurality of auxiliary heat sources are simultaneously used, or one of them is selectively used.

In another aspect of the present invention, there is provided an air conditioning system using ground heat, the system including: one or more indoor units for conditioning indoor air; at least one outdoor unit communicating with the indoor units via a plurality of pipes, and including an outdoor heat exchanger where heat exchange occurs; a ground heat exchanger connected with the outdoor heat exchanger of the outdoor unit, and laid under the ground to allow heat to be exchanged between ground heat and a circulating medium circulating through the ground heat exchanger; and an auxiliary heat sources installed on one side of the outdoor unit to assist heat exchange of the outdoor heat exchanger, wherein the auxiliary heat source comprises one of a boiler installed between the outdoor unit and the ground heat exchanger to heat the circulating medium circulating through the ground heat exchanger, and a cooling tower installed between the outdoor unit and the ground heat exchanger to cool down the circulating medium circulating through the ground heat exchanger.

In further another aspect of the present invention, there is provided an air conditioning system using ground heat, the system including: one or more indoor units for conditioning indoor air; at least one outdoor unit communicating with the indoor units via a plurality of pipes, and including an outdoor heat exchanger where heat exchange occurs, and a plurality of compressors for compressing coolant; a plurality of ground heat exchangers connected with the outdoor heat exchanger of the outdoor unit, and laid under the ground to allow heat to be exchanged between ground heat and a circulating medium circulating through the ground heat exchanger; an auxiliary heat source installed between the outdoor unit and the ground heat exchanger, and selectively used to correspond to a load applied to the indoor units; and a circulation distributor installed between the outdoor unit and the plurality of ground heat exchangers to control flow of the circulating medium.

According to the present invention, an air conditioner can stably perform cooling/heating cycles, and improves cooling/heating efficiencies, so that it has great industrial applicability.

Specifically, according to the above-described air conditioning system using ground heat, coolant at an outdoor heat exchanger provided to an outdoor unit exchanges heat using circulating medium such as water. The circulating medium exchanges heat with heat of a ground at a ground heat exchanger laid deep under the ground. Since the outdoor heat exchanger is a water-cooled heat exchanger where heat is exchanged between a circulating medium (water) and heat of a ground as described above, the outdoor heat exchanger of the present invention provides relatively higher thermal efficiency of COP and EER than that of a related art heat exchanger using air. Therefore, an air conditioning performance of the air conditioning system improves.

Also, according to the present invention, a plurality of outdoor units, indoor units, and ground heat exchangers are provided. Also, a coolant distributor for distributing coolant, and a circulating distributor for distributing a circulating medium are installed. Therefore, since only some of indoor units, outdoor units, and ground heat exchangers can be used depending on a user's selection or setting values of a control unit, energy is saved. That is, operations of unnecessary equipments are prevented, an energy efficiency improves.

Also, some of the plurality of indoor units can be used for a heating cycle, and some of the plurality of outdoor units can be used for a cooling cycle. Therefore, since one system can perform a variety of functions simultaneously, a function of a product is promoted.

Also, the present invention provides a system for cooling or heating a circulating medium using selectively a plurality of auxiliary heat sources besides a ground heat exchanger that uses ground heat. Therefore, in the case where ground heat is insufficient in condensing or evaporating coolant at an outdoor heat exchanger, the auxiliary heat source operates to assist heating or cooling of a circulating medium. Therefore, there is an advantage that coolant can be evaporated or condensed using the auxiliary heat source even under an environment where ground heat is insufficient for the outdoor heat exchanger to evaporate or condense the coolant. That is, an air conditioning system according to the present invention exhibits a stable air conditioning performance, not affected by ground heat.

Also, according to the present invention, a plate type heat exchanger formed by stacking partition plates is used as an outdoor heat exchanger. Therefore, a volume of the outdoor unit is smaller than that of a related art outdoor unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. The present invention provides a geothermal air conditioning system that uses an outdoor unit also called ground source heat pumps (GSHPs). The geothermal air conditioning system is a system that uses ground heat as a heat source of an outdoor heat exchanger, wherein the outdoor heat exchanger exchanges heat using water (heat exchange water) having a predetermined temperature caused by the ground heat.

Figure 1:
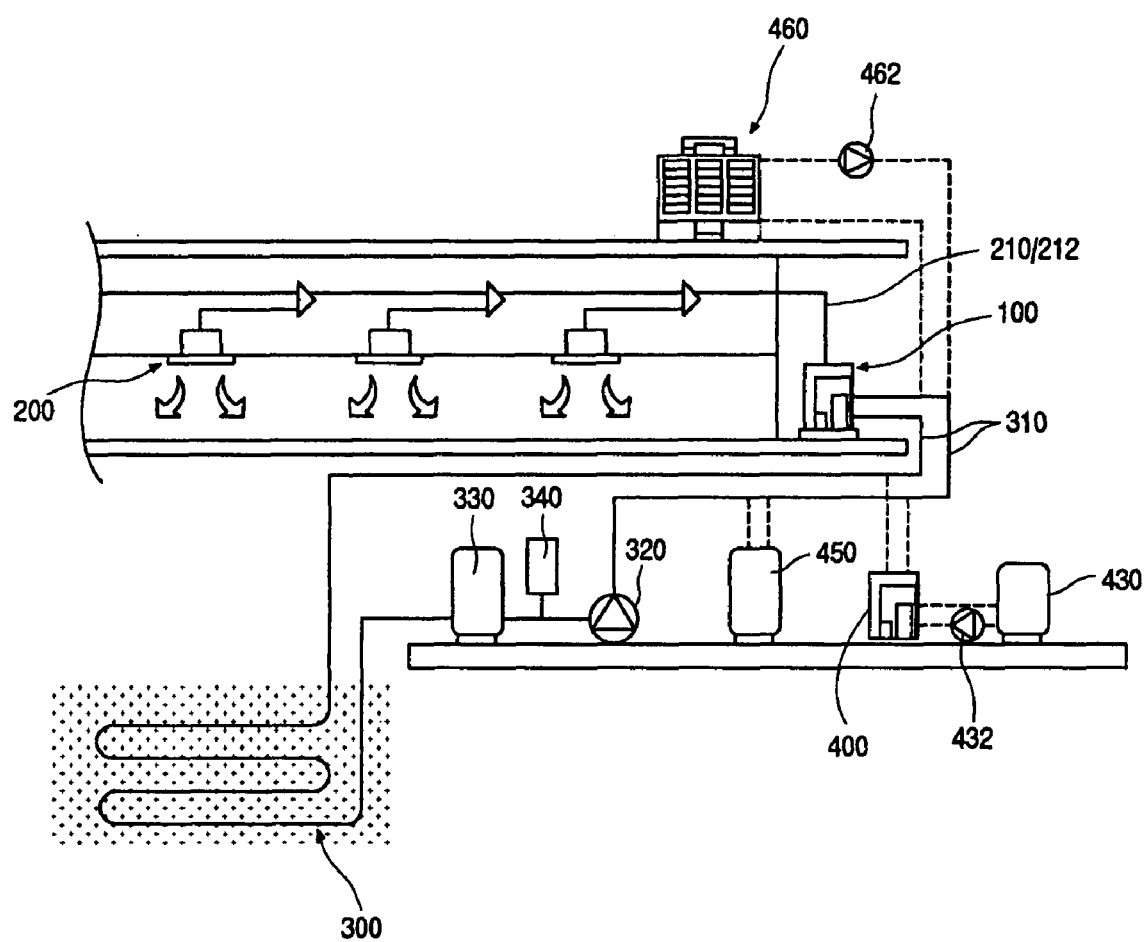
FIG. 1 is a view illustrating a geothermal air conditioning system is installed according to a first embodiment of the present invention.
Figure 2:
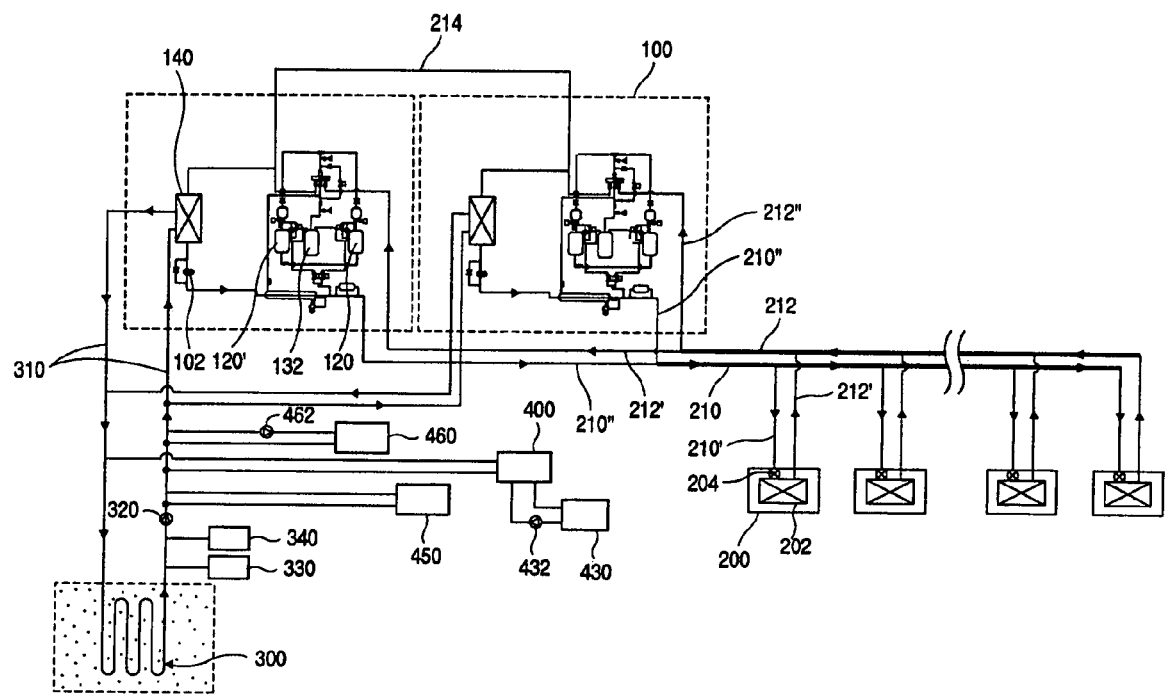
FIG. 2 is a block diagram illustrating a construction and a coolant flow of a geothermal air conditioning system according to the present invention.

FIG. 1 is a view illustrating a geothermal air conditioning system is installed according to a first embodiment of the present invention, and FIG. 2 is a block diagram of a geothermal air conditioning system according to the present invention.

Referring to FIGS. 1 and 2, the geothermal air conditioning system includes one or more indoor units 200 for conditioning indoor air, one or more outdoor units 100 for communicating with the indoor units 100 via a plurality of pipes, a ground heat exchanger 300 laid under the ground to allow heat to be exchanged between heat of a ground and a circulating medium circulating through an inside of the ground heat exchanger; and a plurality of auxiliary heat sources 400, 450, and 460 for assisting heat exchange at an outdoor heat exchanger provided to the outdoor unit 100.

The outdoor unit 100 includes a constant-speed compressor 120, an inverter compressor 120', an accumulator 132, an outdoor heat exchanger 140, and an outdoor linear expansion valve (LEV) 102. The indoor unit 200 includes an indoor heat exchanger 202 and an expansion valve 204.

In an air conditioner, a plurality of indoor units 200 are connected to one or more outdoor units 100. A single common liquid pipe 210 through which liquid coolant flows and a single common gas pipe 212 through which gas coolant flows are installed between the outdoor units 100 and the indoor units 200 so that they communicate with each other. Also, a high-low pressure common pipe 214 for maintaining balance of coolant is installed between two or more outdoor units 100 so that the outdoor units 100 communicate with each other.

The high-low pressure common pipe 214 is installed such that entries of outdoor heat exchangers 140 provided to the plurality of outdoor units 100 communicate with each other to maintain balance of coolant among the outdoor units 100. Meanwhile, the high-low pressure common pipe 214 allows coolant to flow into even an outdoor heat exchanger 140 of the outdoor unit 100 that is not used. Accordingly, a heat exchange efficiency improves on the whole. Also, high pressure coolant or low pressure coolant flows through a low the high-low pressure common pipe 214 depending on a cooling cycle and a heating cycle.

Branch liquid pipes 210' through which liquid coolant flows, and branch gas pipes 212' through which gas coolant flows are provided to the indoor units 200. The branch liquid pipes 210' and the branch gas pipes 212' communicate with the common liquid pipe 210 and the common gas pipe 212, respectively.

Also, the branch liquid pipes 210' and the branch gas pipes 212' have a different diameter depending on a capacity of the indoor unit 200 connected thereto.

Meanwhile, outdoor liquid pipes 210" through which liquid coolant flows, and outdoor gas pipes 212" through which gas coolant flows are provided to the outdoor units 100. The outdoor liquid pipes 210" and the outdoor gas pipes 212" communicate with the common liquid pipe 210 and the common gas pipe 212, respectively.

The plurality of auxiliary heat sources 400, 450, and 460 heat or cool a circulating medium flowing through the ground heat exchanger 300. Two or more of the auxiliary heat sources 400, 450, and 460 are simultaneously operated, or one of them is selectively used.

Referring to FIG. 2, the plurality of auxiliary heat sources 400, 450, and 460 include a hot water heat pump 400, a boiler 450, and a cooling tower 460. Of course, one of the hot water heat pump 400, the boiler 450, and the cooling tower 460 can be provided as the auxiliary heat sources 400, 450, and 460. Also, another apparatus can be further provided.

Also, in strictly meaning, since the hot water heat pump 400 is an apparatus for producing hot water, the boiler 450 and the cooling tower 460 would primarily serve as the auxiliary heat source.

The hot water heat pump 400 is installed between the outdoor unit 100 and the ground heat exchanger 300 to allow the circulating medium circulating through the ground heat exchanger 300 to emit hot air and produce hot water through heat exchange with other exchange water.

The boiler 450 is installed between the outdoor unit 100 and the ground heat exchanger 300 to heat the circulating medium circulating through the ground heat exchanger 300.

The cooling tower 460 is installed between the outdoor unit 100 and the ground heat exchanger 300 to cool down the circulating medium circulating through the ground heat exchanger 300. A cooling pump 468 for forcing flowing of the circulating medium (water) that has passed through the cooling tower 460 is further installed inside or outside the cooling tower 460.

A circulating pipe 310 is provided between the outdoor heat exchanger 140 of the outdoor unit 100 and the ground heat exchanger 300 to guide circulation of the circulating medium. The circulating medium is formed of a material, preferably, water ($H_2O$) having high specific heat than that of at least air.

A circulating pump 320 for forcing flowing of the circulating medium is installed in the circulating pipe 310. The circulating pump 320 allows the circulating medium contained inside the circulating pipe 310 to flow in one direction using power applied from the outside.

A supplementary tank 330 for supplementing a shortage of the circulating medium flowing through the circulating pipe 310 is further provided to the circulating pipe 310. Also, a conservation tank 340 for controlling a pressure of the circulating medium flowing through the circulating pipe 310 is installed on one side of the supplementary tank 330.

A hot water tank 430 is provided on one side of the hot water heat pump 400. Water heated by heat exchange with the hot water heat pump 400 is stored in the hot water tank 430. A hot water pump 432 is installed between the hot water heat pump 400 and the hot water tank 430 to force circulating water to flow.

Constructions and connections of the auxiliary heat sources 400, 450, and 460 will be described below in detail.

Figure 3:
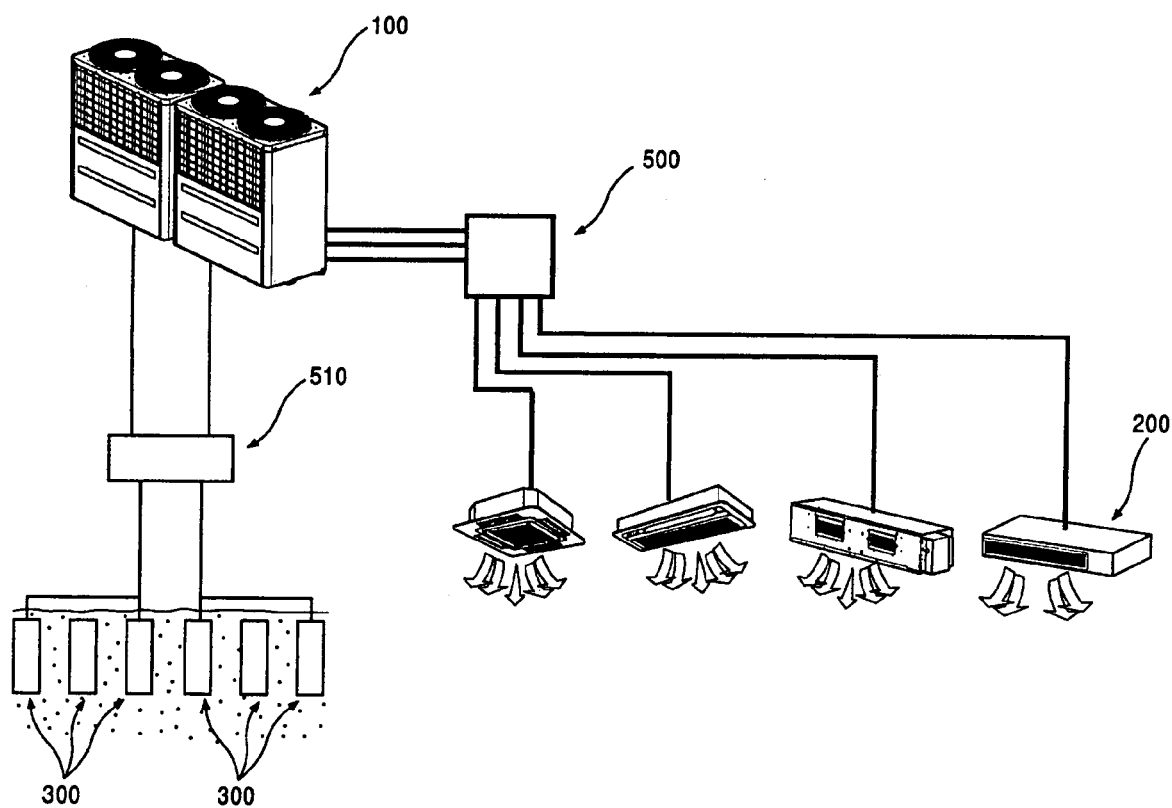
FIG. 3 is a view illustrating a geothermal air conditioning system is installed according to a second embodiment of the present invention.
Figure 4:
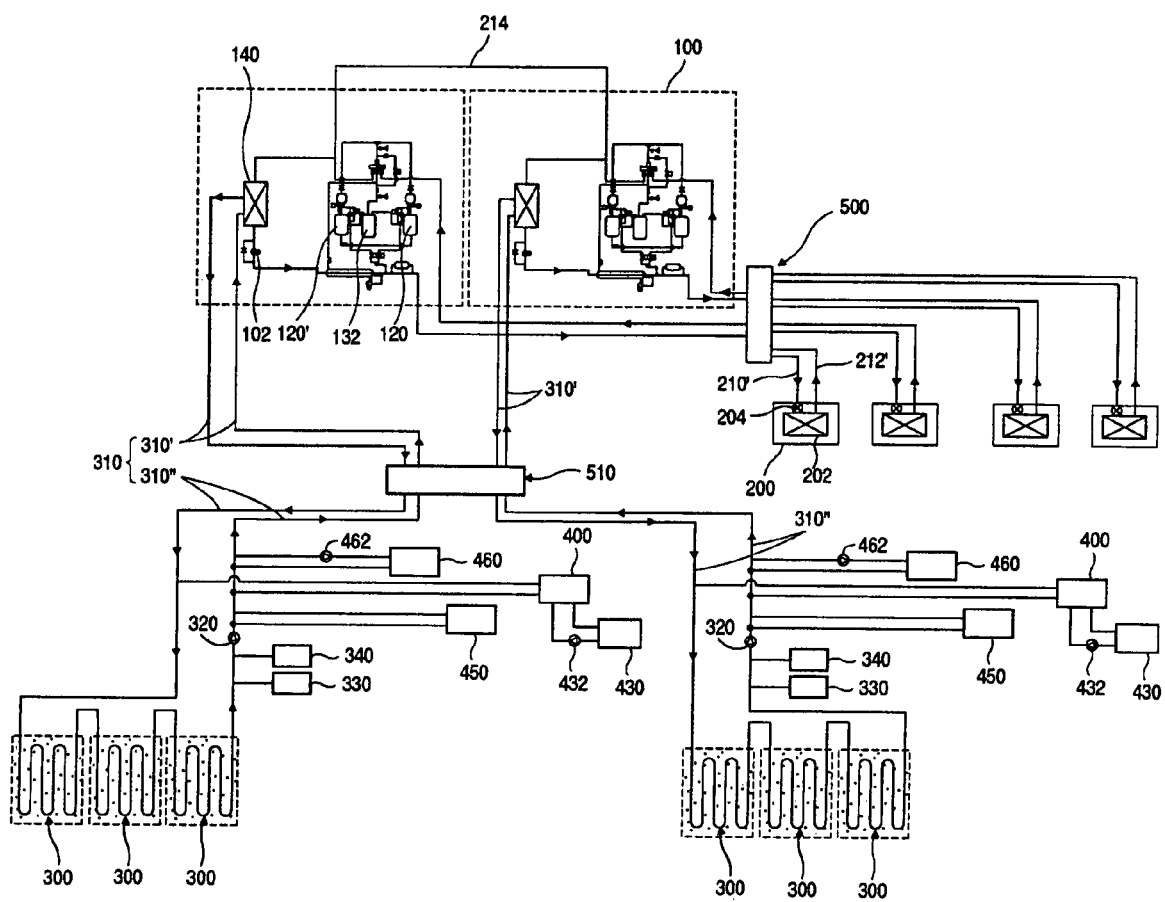
FIG. 4 is a block diagram illustrating a construction and a coolant flow of a geothermal air conditioning system according to a second embodiment of the present invention.

FIGS. 3 and 4 illustrate a geothermal air conditioning system according to a second embodiment of the present invention. That is, FIG. 3 is a view schematically illustrating a geothermal air conditioning system is installed according to a second embodiment of the present invention, and FIG. 4 is a block diagram of a geothermal air conditioning system according to a second embodiment of the present invention.

Referring to FIGS. 3 and 4, the geothermal air conditioning system according to the second embodiment of the present invention further includes a coolant distributor 500 and a circulation distributor 510 besides the construction of the geothermal air conditioning system according to the first embodiment of the present invention.

That is, unlike the first embodiment, the second embodiment includes a coolant distributor 500 provided to a connection portion between the branch liquid pipe 210' and the branch gas pipe 212', and the outdoor liquid pipe 210" and the outdoor gas pipe 212" to control flow of coolant.

Also, a circulation distributor 510 for controlling flow of the circulating medium is installed between the outdoor heat exchanger 140 and the ground heat exchanger 300. The circulating pipe 310 through which the circulating medium circulates is divided into an outdoor circulating pipe 310' connected to the outdoor heat exchanger 140 and a ground circulating pipe 310" connected to the ground heat exchanger 300. That is, the outdoor circulating pipe 310' is connected between the outdoor heat exchanger 140 and the circulating divider 510 to guide the circulating medium. On the other hand, the ground circulating pipe 310" is connected between the ground heat exchanger 300 and the circulation distributor 510 to guide the circulating medium.

In more detail, the geothermal air conditioning system according to the second embodiment of the present invention includes: a plurality of indoor units 200 for conditioning indoor air; a plurality of outdoor units 100 through which coolant circulates; a plurality of ground heat exchangers 300 laid under the ground to allow heat to be exchanged between heat of the ground and the circulating medium circulating through the inside of the ground heat exchangers 300; a plurality of auxiliary heat sources 400, 450, and 460 for assisting heat exchange at outdoor heat exchangers of the outdoor units 100; the coolant distributor 500 installed between the indoor units 200 and the outdoor units 100 to control coolant's flow depending on an operating condition; and the circulation distributor 510 installed between the outdoor units 100 and the ground heat exchanger 300 to control flow of the circulating medium (water).

The coolant distributor 500 is provided within the indoor units 200 or the outdoor units 100, or separately installed in the outside. Also, though not shown, the coolant distributor 500 includes a plurality of valves to separately control coolant supplied to the plurality of indoor units 200 and outdoor units 100.

In detail, the coolant distributor 500 controls coolant supplied to the indoor units 200 depending on a user's setting or respective conditions of indoor spaces requiring air conditioning.

Of course, though not shown, a coolant control unit is provided on one side of the coolant distributor 500 to control respective valves (not shown) of the coolant distributor 500, and control opening/closing of the branch liquid pipes 210' and the branch gas pipes 212' connected to the indoor units 200. That is, the coolant distributor 500 controls coolant flowing into the indoor units 200 depending on a user's setting, or automatically controls coolant's flow depending on states of respective indoor spaces in which the indoor units 200 are installed.

Also, the coolant distributor 500 also controls coolant supplied to the outdoor units 100. That is, all or some of the outdoor units 100 are selectively used depending on a load applied to the indoor unit 200.

Meanwhile, according to the second embodiment, the outdoor units 100 are individually connected to the coolant distributor 500. That is, the outdoor liquid pipes 210" and the outdoor gas pipes 212" are individually and directly connected to the coolant distributor 500.

Therefore, the coolant distributor 500 controls opening/closing of the outdoor liquid pipes 210" and the outdoor gas pipes 212" to control coolant flowing through the outdoor units 100. Also, a high-low pressure common pipe 214 is connected also between the outdoor units 100 such that the outdoor units 100 communicate with each other to maintain balance of coolant between two or more outdoor units 100.

The circulation distributor 510 is provided within the outdoor unit 100 or separately installed in the outside. Also, the circulation distributor 510 includes a plurality of valves to individually control flow of the circulating medium supplied to the plurality of outdoor units 100 and ground heat exchangers 300.

In more detail, the circulation distributor 510 controls coolant supplied to the ground heat exchangers 300 depending on a user's setting or load of the outdoor heat exchanger 140.

Of course, though not shown, a circulation control unit is provided on one side of the circulation distributor 510 to control an operation of the circulation distributor 510. That is, the circulation control unit controls respective valves (not shown) of the circulation distributor 510 to the circulating medium (water) flowing through the outdoor circulating pipe 310' and the ground circulating pipe 310". That is, the circulation distributor 510 controls a circulating medium flowing into the outdoor heat exchangers 140 depending on a user's setting, or individually controls the circulating medium flowing through the plurality of outdoor heat exchangers 140 depending on whether the outdoor heat exchangers 140 operate or not.

Also, the circulation distributor 510 controls also a circulating medium supplied to the plurality of ground heat exchangers 300. That is, all or some of the ground heat exchangers 300 are selectively used depending on loads applied to the indoor units 200 or the outdoor heat exchangers 140. In other words, the circulation distributor 510 controls flow of the circulating medium by controlling the ground circulating pipes 310" connected to the ground heat exchangers 300 depending on the loads of the indoor units 200 or the outdoor heat exchangers 140.

Since inner constructions of the outdoor units 100 and the indoor units 200, and the plurality of the auxiliary heat sources 400, 450, and 460 are the same as those of the first embodiment, detailed descriptions thereof will be omitted.

Figure 5:
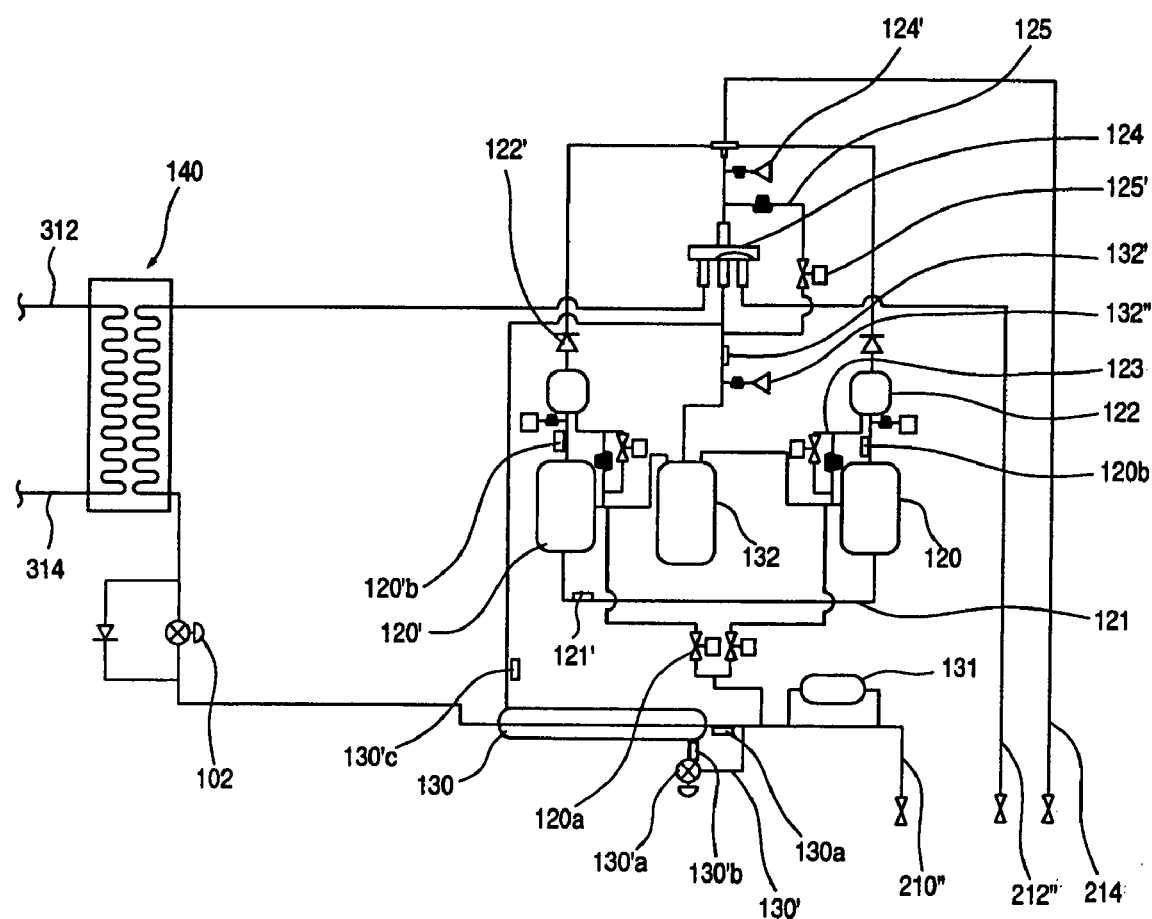
FIG. 5 is a view illustrating a construction of an outdoor unit, which is a crucial part of a geothermal air conditioning system according to the present invention.

FIG. 5 schematically illustrates a construction of an outdoor unit, which is a crucial part of a geothermal air conditioning system according to the present invention. One of plurality of outdoor units will be exemplarily described below for convenience.

Referring to FIG. 5, a plurality of compressors 120 and 120' are installed inside the outdoor unit 100. The compressors 120 and 120' compress coolant to change the coolant to coolant of high temperature and high pressure. That is, a constant-speed compressor 120 operating in a constant speed, and an inverter compressor 120' which is a variable speed heat pump, are installed.

A coolant sprayer 120a is installed at an entry of the compressors 120 and 120'. The coolant sprayer 120a supplies a coolant when the compressors 120 and 120' are overheated depending on their operating states to prevent damages of the compressors 120 and 120'. The coolant used here may be the coolant discharged from the outdoor heat exchanger 140 that will be described below.

Also, a fluid uniform pipe 121 is installed between the constant-speed compressor 120 and the inverter compressor 120' to allow the constant-speed compressor 120 to communicate with the inverter compressor 120'. Therefore, when fluid shortage is generated at one compressor on either side, the fluid shortage is compensated for by the other compressor, so that damages of the compressors 120 and 120' are prevented.

Scroll compressors having low noise and excellent efficiency are used as the compressors 120 and 120', and particularly, the inverter compressor 120' is an inverter scroll compressor whose number of revolutions is controlled depending on a load. Therefore, when a few indoor units 200 are used and a small load is applied, the inverter compressor 120' is operated first. Until the load gradually increases and only the inverter compressor 120' cannot handle the increased load, the constant-speed compressor 120 is not operated.

Compressor discharge temperature sensors 120b and 120'b for measuring temperature of coolant discharged from the compressors 120 and 120' and oil separators 122 are provided exits of the constant-speed compressor 120 and the inverter compressor 120', respectively. The oil separators 122 filter oil mixed in coolant discharged from the compressors 120 and 120' to allow the filtered oil to be collected to the compressors 120 and 120'.

That is, oil used for cooling down friction heat generated during operations of the compressors 120 and 120' is discharged together with the coolant to the exits of the compressors 120 and 120'. The oil included in the coolant is separated by the oil separator 122 and collected to the compressors 120 and 120' via an oil collecting pipe 123.

A check valve 122' is further installed at an exit of the oil separator 122 to prevent coolant from flowing backward. That is, in the case where one of the constant-speed compressor 120 and the inverter compressor 120' is operated, the check valve 122' allows compressed coolant not to flow backward into the compressors 120 and 120' not in use.

The oil separator 122 is formed to communicate with a four-way valve 124 via a pipe. The four-way valve 124 is installed to change a flowing direction of coolant depending on cooling/heating cycles. Respective ports of the four-way valve 124 are connected to exits (or the oil separators) of the compressors 120 and 120', entries (or the accumulators) of the compressors 120 and 120', the outdoor heat exchanger 140, and the indoor heat exchanger 200.

Therefore, coolant discharged from the constant-speed compressor 120 and the inverter compressor 120' is collected to one place and flows into the four-way valve 124. A high pressure sensor 124' is installed at an entry of the four-way valve 124 to check pressure of coolant discharged from the compressors 120 and 120'.

Meanwhile, a hot gas pipe 125 is installed across the four-way valve 124 to allow a portion of coolant flowing from the oil separator 122 to the four-way valve 124 to directly flow into the accumulator 132 which will be described below.

The hot gas pipe 125 allows high pressure coolant from discharge ports of the compressors 120 and 120' to directly flow to the entries of the compressors 120 and 120' in the case where pressure of low pressure coolant flowing to the accumulator 132 needs to be raised during an operation of the air conditioner. A hot gas valve 125', which is a bypass valve, is installed in the hot gas pipe 125 to open/close the hot gas pipe 125.

Also, an overcooler 130 is provided inside the outdoor unit 100. The overcooler 130 is an overcooling means for cooling down even more the coolant heat-exchanged at the outdoor heat exchanger 140 which will be described below. The overcooler 130 is formed at an arbitrary position of the outdoor liquid pipe 210" connected to an exit of the outdoor heat exchanger 140.

The overcooler 130 may be a double pipe. That is, the outdoor liquid pipe 210" is provided inside the overcooler 130, and a reverse transfer pipe 130' is formed side the overcooler 130. The reverse transfer 130' branches from an exit of the overcooler 130. An overcooling expansion valve 130'a for cooling down coolant through expansion of the coolant is installed in the reverse transfer pipe 130'.

With this construction, a portion of coolant discharged from the overcooler 130 flows into the reverse transfer pipe 130' and is cooled down while it passes through the overcooling expansion valve 130'a, and inner coolant is cooled down even more while the cooled coolant flows through the overcooler 130 backward. The coolant flowing backward from the overcooler 130 is supplied back to the accumulator 132 and circulated.

Meanwhile, a liquid pipe temperature sensor 130a is installed at an exit of the overcooler 130 to measure temperature of coolant discharged from the outdoor unit 100. An overcooling entry sensor 130'b is provided to an exit of the overcooling expansion valve 130'a to measure temperature of coolant flowing to the overcooler 130. An overcooling exit sensor 130'c is provided to the reverse transfer pipe 130' through which coolant flowing backward from the overcooler 130 flows.

Therefore, coolant that has passed through the outdoor heat exchanger 140 flows through a central portion, and low temperature coolant expanded by an expansion valve (not shown) flows in the outside to cool down temperature of coolant even more.

A drier 131 is installed on one side of the overcooler 130, i.e., on one side of the outdoor liquid pipe 210" through which coolant discharged from the outdoor heat exchanger 140 is guided to the indoor unit 200. The drier 131 removes humidity contained in coolant flowing through the outdoor liquid pipe 210".

The accumulator 132 is installed between the constant-speed compressor 120 and the inverter compressor 120'. The accumulator 132 filters liquid coolant to allow only gas coolant to flow into the compressors 120 and 120'.

When a portion of coolant flowing from the indoor unit 200 that is not evaporated but remains in a liquid state directly flows into the compressors 120 and 120', a load applied to the compressors 120 and 120' changing coolant to high temperature and high pressure gas coolant increases to cause damages of the compressors 120 and 120'.

Therefore, since a portion of coolant flowing into the accumulator 132 that is not evaporated but remains in a liquid state is relatively heaver than gas coolant, the liquid coolant is stored in a lower portion of the accumulator 132, and only the gas coolant flows into the compressors 120 and 120'. Meanwhile, an inflow pipe temperature sensor 132' for measuring temperature of coolant flowing from the outside, and a low pressure sensor 132' for measuring pressure of coolant are provided to an entry of the accumulator 132.

The outdoor heat exchanger 140 is provided inside the outdoor unit 100. The outdoor heat exchanger 140 allows heat to be exchanged between coolant flowing through the outdoor heat exchanger 140 and the circulating medium flowing through the circulating pipe 310. The outdoor heat exchanger 140 may be a water-cooled heat exchanger.

Though not shown, the outdoor heat exchanger 140 that is a water-cooled heat exchanger may be a plate-type heat exchanger formed by stacking a plurality of thin plates alternately. Therefore, coolant flows through the inside of some of the thin plates, and the circulating medium flows through the inside of the rest of the thin plates. That is, since the thin plates through which the coolant and the circulating medium flow are stacked alternately, the coolant and the circulating medium exchange heat while they flow in directions intersecting each other in the inside of respective thin plates.

Figure 6:
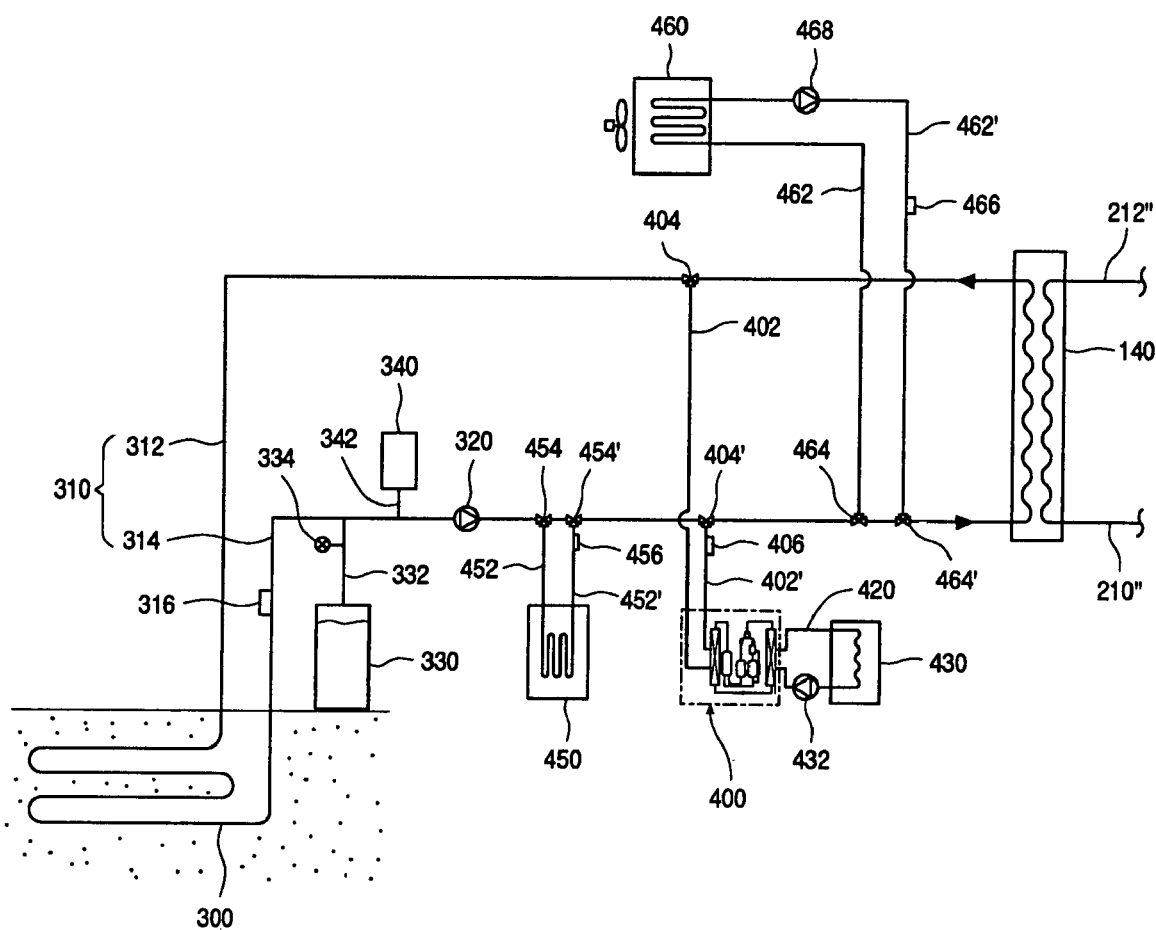
FIG. 6 is a block diagram illustrating connections of an auxiliary heat source constituting a geothermal air conditioning system according to the present invention.

FIG. 6 illustrates in more detail a construction and connections of the auxiliary heat sources 400, 450, and 460. Here, one of ground heat exchangers is exemplarily described for convenience. Therefore, illustration of the circulation distributor 510 will be omitted.

Referring to FIG. 6, a coolant pipe and the circulating pipe 310 that communicate with the indoor heat exchanger 202 are connected to the outdoor heat exchanger 140 of the outdoor unit 100. That is, the outdoor liquid pipe 210", the outdoor gas pipe 212", and the circulating pipe 310 are connected to the outdoor heat exchanger 140.

Therefore, heat is exchanged between coolant flowing through the outdoor liquid pipe 210", the outdoor gas pipe 212", and a circulating medium (water) flowing through the circulating pipe 310. The circulating pipe 310 is formed to constitute a closed loop on the whole to allow the inner circulating medium to circulate constantly while it is isolated from the outside.

Meanwhile, though not shown, a separate control unit is further provided to operate the above-described plurality of parts and to control an operation of the system on the whole. That is, the control unit for judging whether to operate the auxiliary heat sources such as the boiler 450 and the cooling tower 460, and controlling the same is separately provided. The control unit is connected to temperature sensors of respective parts to control operations of the respective parts on the whole depending on a user's setting.

The control unit judges loads applied to the plurality of indoor units 200 to judge whether to operate the auxiliary heat source. That is, in response to a load changing as some of the plurality of indoor units 200 are used or depending on intensity of cooling/heating cycles of the indoor units 200, the control unit estimates an extent of heat exchange of the outdoor heat exchanger 140. When heat exchange is not performed properly at the outdoor heat exchanger 140, the control unit operates the auxiliary heat sources and controls an operation of the auxiliary heat sources.

Of course, the control unit can have a function of the above-described coolant control unit and circulation control unit, simultaneously.

The ground heat exchanger 300 is laid deep under the ground to allow heat to be exchanged between heat of the ground and the circulating medium flowing through the circulating pipe 310. That is, the ground heat exchanger 300 may be laid under the ground up to 1-200 m. A depth at which the ground heat exchanger 300 is laid changes depending on climate of an installation area. The ground heat exchanger 300 may be laid at a depth that can always maintain an annual average temperature of that area.

A plurality of ground heat exchangers 300 can be provided. The ground heat exchanger 300 may be formed in a zigzag shape bent a plurality of number of times as illustrated.

As described above, the circulating pipe 310 is connected between the ground heat exchanger 300 and the outdoor heat exchanger 140 to allow the circulating medium (water) to flow. The circulating pipe 310 includes a supply pipe 312 allowing the circulating medium to flow into the ground heat exchanger 300, and a return pipe 314 allowing the circulating medium that has passed through the ground heat exchanger 300 to return to the outdoor heat exchanger 140.

The return pipe 314 is provided with a circulation temperature sensor 316. In more detail, the circulating temperature sensor 316 is installed at an exit of the ground heat exchanger 300 to measure temperature of the circulating medium that has passed through the ground heat exchanger 300. A temperature value measured by the circulating temperature sensor 316 is delivered to a control unit (not shown) controlling the system on the whole.

The hot water heat pump 400 is used in cooperation with the ground heat exchanger 300, or selectively used. That is, only the hot water heat pump 400 can be used for heat exchange of the outdoor heat exchanger 140 without use of the ground heat exchanger 300. Also, whether to use the hot water heat pump 400 is determined under control of the control unit.

Of course, in the case where the hot water heat pump 400 is used independently, it can be used by a user's selection or setting. Even in this case, a user's setting signal is delivered to the control unit, and therefore, the control unit controls whether to operate the hot water heat pump 400 and an operation intensity. Also, an inner operation of the hot water heat pump 400 is controlled by the control unit or a separate hot water control unit.

A heat pump supply pipe 402 and a heat pump return pipe 402' are connected between the circulating pipe 310 and the hot water heat pump 400 to guide flow of the circulating medium (water). In more detail, the heat pump supply pipe 402 branches from the supply pipe 312 to guide the circulating medium to the hot water heat pump 400. The heat pump return pipe 402' branches from the return pipe 314 to guide the circulating medium returning to the return pipe 314 after having passed through the hot water heat pump 400.

A heat pump supply valve 404 is provided to a connection portion between the supply pipe 312 and the heat pump supply pipe 402. A hot water return valve 404' is provided to a connection portion between the return pipe 314 and the heat pump return pipe 402'. Each of the heat pump supply valve 404 and the hot water return valve 404' is a three-way valve that can control fluid flow of three directions. Opening/closing of each valve is performed under control of the control unit.

Therefore, the heat pump supply valve 404 controls the circulating medium coming from the outdoor heat exchanger 140 and flowing through the supply pipe 312 to be supplied to both the ground heat exchanger 300 and the hot water heat pump 400, or to be supplied to one of the ground heat exchanger 300 and the hot water heat pump 400.

A hot water temperature sensor 406 is installed in the heat pump return pipe 402'. That is, the hot water temperature sensor 406 is installed at an exit of the hot water heat pump 400 to measure temperature of the circulating medium discharged from the hot water heat pump 400 via the heat pump return pipe 402'. The hot water temperature sensor 406 is connected to a control unit (not shown) to provide the measured temperature to the control unit.

Heat exchange is performed in the inside of the hot water heat pump 400. That is, not only heat exchange with the circulating medium, but also heat exchange with exchange water flowing through a hot water circulating pipe 420, which will be described below, is performed.

The hot water tank 430 is connected to one side (the right side in FIG. 6) of the hot water heat pump 400. Also, the hot water circulating pipe 420 constituting a closed loop is connected between a hot water condenser 412 and the hot water tank 430. Exchange water circulates through the hot water circulating pipe 420. Therefore, heat exchange is performed while the exchange water flowing through the hot water circulating pipe 420 passes through the hot water condenser 412. Exchange water becomes hot by the heat exchange flows into the hot water tank 430 via the hot water circulating pipe 420 to exchange heat with water stored in the hot water tank 430. In this way, the water stored in the hot water tank 430 is heated.

The hot water pump 432 is installed in the hot water circulating pipe 420. The hot water pump 432 is operated by external power to allow exchange water flowing through the hot water circulating pipe 420 to flow constantly in one direction.

The boiler 450 is connected to the circulating pipe 310 to heat the circulating medium. That is, the boiler 450 is connected to the return pipe 314 of the circulating pipe 310.

In more detail, the boiler 450 heats the circulating medium using energy supplied from the outside. A boiler supply pipe 452 and a boiler return pipe 452' are formed between the boiler 450 and the return pipe 314 to communicate each other.

The boiler supply pipe 452 is a passage allowing the circulating medium flowing through the return pipe 314 to flow into the boiler 450. The boiler return pipe 452' is a passage allowing the circulating medium that has passed through the boiler 450 to return to the return pipe 314.

A boiler supply valve 454 and a boiler return valve 454' are installed at connection portions between the return pipe 314 and the boiler supply pipe 452, and between the return pipe 314 and the boiler return pipe 452', respectively. Like the above-described heat pump supply valve 404 and hot water return valve 404', each of the boiler supply valve 454 and the boiler return valve 454' may be a three-way valve that can control fluid flow of three directions. Therefore, supply of the circulating medium to the boiler 450 is controlled depending on opening/closing of the boiler supply valve 454 and the boiler return valve 454'.

A boiler temperature sensor 456 is installed in the boiler return pipe 452'. That is, the boiler temperature sensor 456 measures temperature of the circulating medium that has passed through the boiler 450. The temperature measured by the boiler temperature sensor 456 is delivered to the control unit.

The cooling tower 460 is connected to the return pipe 314. The cooling tower 460 cools down the circulating medium using contact with air. Since the cooling tower 460 is a device used for cooling down cooling water in factories, detailed description thereof is omitted.

A cooling tower supply pipe 462 and a cooling tower return pipe 462' are formed between the return pipe 314 and the cooling tower 460 to communicate with each other. The cooling tower supply pipe 462 is a passage allowing the circulating medium flowing through the return pipe 314 to flow into the cooling tower 460. The cooling tower return pipe 462' is a passage allowing the circulating medium that has passed through the cooling tower 460 to return to the return pipe 314.

A cooling tower supply valve 464 and a cooling tower return valve 464' are installed at connection portions between the return pipe 314 and the cooling tower supply pipe 462, and between the return pipe 314 and the cooling tower return pipe 462', respectively. Like the above-described heat pump supply valve 404 and hot water return valve 404', each of the cooling tower supply valve 464 and the cooling tower return valve 464' may be a three-way valve that can control fluid flow of three directions. Therefore, supply of the circulating medium to the cooling tower 460 is controlled depending on opening/closing of the cooling tower supply valve 464 and the cooling tower return valve 464'.

A cooling temperature sensor 466 is installed in the cooling tower return pipe 462'. That is, the cooling temperature sensor 466 measures temperature of the circulating medium that has passed through the cooling tower 460. Temperature measured at the cooling temperature sensor 466 is delivered to the control unit.

Meanwhile, a cooling pump 468 is further installed in the cooling tower return pipe 462'. The cooling pump 468 applies pressure in one direction (the right side in FIG. 6) so that the circulating medium that has passed through the cooling tower 460 to flow into the outdoor heat exchanger 140 via the return pipe 314. That is, the circulating medium that has flowed into the cooling tower 460 is exposed to air for heat exchange with the air, and is collected again and allowed to flow through the cooling tower return pipe 462'. As described above, the cooling pump 468 forces flowing of the circulating medium flowing through the cooling tower return pipe 462', and prevents the circulating medium from flowing backward.

The circulating pump 320 may be installed in the return pipe 314 to force flowing of the circulating medium flowing through the circulating pipe 310. In more detail, the circulating pump 320 is installed in parallel between the conservation tank 340 and the boiler 450 to force flowing of the circulating medium in one direction (the right side in FIG. 6) as illustrated.

The supplementary tank 330 is a circulating medium storing device for supplying the circulating medium to the circulating pipe 310. That is, the supplementary tank 330 is designed for supplementing circulating medium that becomes insufficient by evaporation or leakage generated while the circulating medium passes through the circulating pipe 310.

The supplementary tank 330 is formed to communicate with other pipes by the return pipe 314 and the supplementary pipe 332. Also, a supplementary valve 334 is installed in the supplementary pipe 332 to open/close the supplementary pipe 332 to control the circulating medium supplied to the return pipe 314.

The supplementary valve 334 is manually opened/closed by a user, or automatically opened/closed under control of the control unit (not shown).

The conservation tank 340 is formed to communicate with other pipes by the return pipe 314 and a conservation pipe 342 to control pressure of the circulating medium flowing through the circulating pipe 310. That is, the conservation tank 340 serves as a buffer region for controlling pressure of the circulating medium flowing through the circulating pipe 310 that changes transiently. The conservation tank 340 is installed apart from the return pipe 314, or integrally formed in an intermediate portion of the return pipe 314.

Figure 7:
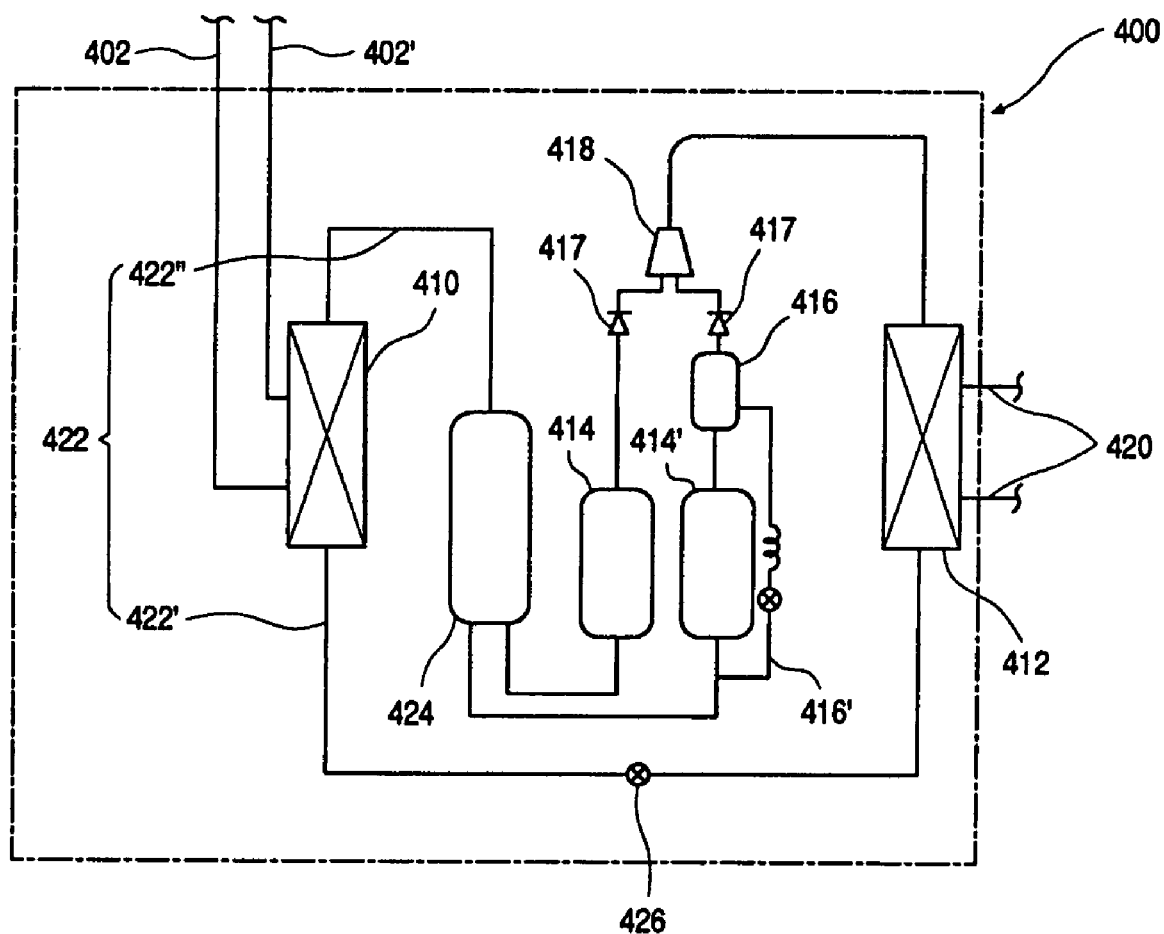
FIG. 7 is a block diagram illustrating a hot water heat pump according to an embodiment of the present invention.

FIG. 7 illustrates a block diagram of the hot water heat pump 400.

Referring to FIG. 7, a plurality of parts such as a hot water evaporator 410 and a hot water condenser 412 where heat exchange occurs are installed in the hot water heat pump 400. The hot water evaporator 410 and the hot water condenser 412 communicate with each other via a hot water pipe 422. Also, hot water coolant flows through the hot water pipe 422.

The hot water evaporator 410 and the hot water condenser 412 are heat exchangers corresponding to the outdoor heat exchanger 140 and the indoor heat exchanger 202, respectively. Each of the hot water evaporator 410 and the hot water condenser 412 is a water-cooled heat exchanger which exchanges heat using water, not air. Also, the hot water coolant may be the same as the coolant flowing between the indoor heat exchanger 202 and the outdoor heat exchanger 140.

In more detail, the hot water evaporator 410 allows heat to be exchanged between the circulating medium flowing through the circulating pipe 310 and hot water coolant flowing through the hot water pipe 422. Also, the hot water condenser 412 is a portion where hot water coolant flowing through the hot water pipe 422 exchanges heat with exchange water circulating through the hot water circulating pipe 420.

The hot water evaporator 410 serves as an evaporator. Therefore, heat is exchanged between a high temperature circulating medium and low temperature hot water coolant at the hot water evaporator 410. Therefore, the high temperature circulating medium is cooled down and condensed, and the low temperature hot water coolant receives heat and evaporates to change into high temperature coolant (preferably gas coolant).

On the other hand, the hot water condenser 412 serves as a condenser. Therefore, heat is exchanged between high temperature hot water coolant and low temperature exchange water at the hot water condenser 412.

Therefore, the high temperature hot water coolant is cooled down and condensed, and the low temperature exchange water receives heat and evaporates to change into, preferably, high temperature gas state.

The hot water pipe 422 is divided into a hot water liquid pipe 422' and a hot water gas pipe 422". Relatively high temperature hot water coolant flows through the hot water liquid pipe 422', and is introduced into the hot water evaporator 410 via the hot water liquid pipe 422'. Also, relatively low pressure hot water coolant flows through the hot water gas pipe 422". Hot water coolant that has passed through the hot water evaporator 410 flows through the hot water gas pipe 422".

The hot water gas pipe 422" is provided with a plurality of hot water compressors 414 and 414'. The hot water compressors 414 and 414' compress hot water coolant to change the coolant into high temperature and high pressure coolant. The hot water compressors 414 and 414' may be a hot water constant speed compressor 414 operating in a constant speed, and a hot water inverter compressor 414', which is a variable speed heat pump.

Scroll compressors having small noise and excellent efficiency may be used as the hot water compressors 414 and 414' as in the above-described compressors 120 and 120', and particularly, an inverter scroll compressor whose number of revolutions is controlled depending on a load of the hot water condenser 412 is used as the hot water inverter compressor 414'. Therefore, when a load applied to the hot water condenser 412 is relatively small, only the hot water inverter compressor 414' is operated first. Until the load gradually increases and only the hot water inverter compressor 414' cannot process the increased load, the hot water constant speed compressor 414 is not operated.

Hot water oil separators 416 are provided to exits of hot water inverter compressors 414', respectively. The hot water oil separators 416 filter oil mixed in coolant discharged from the hot water inverter compressors 414' to allow the filtered oil to be collected to the hot water inverter compressors 414'. That is, oil used for cooling down friction heat generated during operations of the hot water inverter compressors 414' is discharged together with the coolant to the exits of the hot water inverter compressors 414'. The oil included in the coolant is separated by the hot water oil separators 416 and collected to the hot water inverter compressors 414' via a hot water oil collecting pipe 416'.

A hot water check valve 417 is further installed at exits of the hot water oil separators 416 and the hot water constant speed compressor 414 to prevent coolant from flowing backward. That is, the hot water check valve 417 prevents hot water coolant from flowing backward into the hot water compressors 414 and 414' that are not in use in the case where only one of the hot water constant speed compressor 414 and the hot water inverter compressor 414' operates.

Coolant discharged from the hot water constant speed compressor 414 and the hot water inverter compressor 414' joins together at a joining valve 418, and flows into the hot water condenser 412.

A hot water accumulator 424 is installed at entries of the hot water constant speed compressor 414 and the hot water inverter compressor 414' to filter liquid coolant and allow only gas coolant to flow into the hot water compressors 414 and 414'. That is, since a portion of hot water coolant discharged after having passed through the hot water evaporator 410 that is not yet evaporated as a gas but remains in a liquid state is relatively heaver than gas hot water coolant, the liquid coolant is stored and filtered in a lower portion of the hot water accumulator 424, and only the gas hot water coolant in an upper portion flows into the hot water compressors 414 and 414'.

A hot water expansion valve 426 is installed at the hot water liquid pipe 422'. The hot water expansion valve 426 performs the same function as that of the expansion valve 204 provided to the indoor unit 200. The hot water expansion valve 426 reduces pressure of hot water coolant that flows into the hot water evaporator 410.

An operation of a geothermal air conditioning system having the above-described construction according to the present invention will be described below.

An operation of a geothermal air conditioning system according to a first embodiment of the present invention will be described.

First, flow of coolant and a circulating medium according to the first embodiment of the present invention will be described on the whole with reference to FIG. 2.

Since a closed loop through which coolant flows is formed between the indoor unit 200 and the outdoor unit 100, coolant exchanges heat while it circulates through the outdoor unit 100 and the indoor unit 200 as illustrated in arrows.

At this point, the outdoor heat exchanger 140 is a water-cooled heat exchanger. Therefore, heat is exchanged between coolant circulating through the indoor unit 200 and the outdoor unit 100, and a circulating medium (water) circulating through the outdoor unit 100 and the ground heat exchanger 300 at the outdoor heat exchanger 140.

Meanwhile, coolant flowing through the indoor unit 200 and the outdoor unit 100 flows in opposite directions depending on cooling/heating cycles performed for indoor space. On the other hand, a direction of the circulating medium (water) flowing through the circulating pipe 310 is always constant and does not need to be switched in a reverse direction. That is, the circulating medium flowing through the circulating pipe 310 constantly flows in a direction illustrated by arrows in FIG. 2.

Next, flow and operations of coolant flowing through the outdoor unit 100 and the indoor unit 200 will be described in more detail with reference to FIGS. 2 and 5.

As described above, a plurality of indoor units 200 are connected to one outdoor unit 100 in air conditioning system according to the present invention, and all or some of the indoor units 200 are operated depending on a user's selection. Also, all of the plurality of indoor units 200 operate for cooling or heating the indoor space.

When the air conditioning system operates (for cooling the indoor space), the outdoor LEV 102 is opened to allow coolant to flow between the outdoor unit 100 and the indoor unit 200.

First, coolant flowing at the outdoor unit 100 will be described. Gas coolant flowing from the indoor unit 200 passes through the four-way valve 124 and flows into the accumulator 132. Gas coolant from the accumulator 132 flows into the compressors 120 and 120'. Meanwhile, when coolant supplied to the compressors 120 and 120' is insufficient, or the compressors 120 and 120' are overheated, coolant is supplied from the coolant sprayer 120a.

Coolant compressed by the compressors 120 and 120' is discharged via a discharge port to pass through the oil separator 122. Oil contained in coolant is separated by the oil separator 122 and collected to the compressors 120 and 120' through the oil collecting pipe 123.

That is, while coolant is compressed by the compressors 120 and 120', oil is mixed into coolant. Since the oil is in a liquid state and coolant is in a gas state, the oil is separated by the oil separator 122, which is a gas-liquid separator.

Meanwhile, balance of oil contained inside the both compressors 120 and 120' is maintained by the fluid uniform pipe 121 connecting the constant-speed compressor 120 with the inverter compressor 120'.

Coolant that has passed through the oil separator 122 passes through the four-way valve 124 and flows into the outdoor heat exchanger 140. Since the outdoor heat exchanger 140 serves as an condenser (during a cooling cycle), coolant is cooled down and changes into liquid coolant through heat exchange with the circulating medium. The coolant that has passed through the outdoor heat exchanger 140 is cooled down even more while it passes through the overcooler 130.

The coolant that has passed through the overcooler 130 passes through the drier 131 for removing humidity contained in the coolant, and flows into the indoor unit 200 via the common liquid pipe 210. Meanwhile, a portion of coolant that has passed through the compressors 120 and 120' may flow into other outdoor unit 100 via the high-low pressure common pipe 214.

The coolant supplied to other outdoor unit 100 via the high-low pressure common pipe 214 flows into the outdoor heat exchanger 140 of the outdoor unit 100 that is not in use to make coolant pressure balanced on the whole, and allows predetermined heat exchange to be performed even at the outdoor heat exchanger 140 of the outdoor unit 100 that is not in use.

When coolant is supplied to the indoor unit 200 via the common liquid pipe 210, the coolant is supplied to respective indoor units 200 in operation via the branch liquid pipes 210' branching from the common liquid pipe 210. Also, the coolant is reduced in pressure at the expansion valve 204, and exchanges heat at the indoor heat exchanger 202. At this point, since the indoor heat exchanger 202 serves as an evaporator, the coolant changes into a low pressure gas through the heat exchange.

The coolant discharged from the indoor heat exchangers 202 passes through the branch pipes 212', and is collected at the common gas pipe 212, and then flows into the outdoor unit 100. The coolant that has flowed into the outdoor unit 100 via the common gas pipe 212 and the outdoor gas pipes 212" passes through the four-way valve 124 and flows into the accumulator 132.

Liquid coolant that is not yet evaporated is filtered at the accumulator 132. Only gas coolant is selected and supplied to the compressors 120 and 120'. The above-described processes complete one cycle.

Meanwhile, in the case where the air conditioning system operates in a heating cycle, coolant flows in an opposite direction, and an amount of coolant is controlled at the outdoor LEV 102.

Next, an operation of a geothermal air conditioning system will be described according to a second embodiment of the present invention.

Flow of coolant and a circulating medium on the whole according to the second embodiment of the present invention is almost the same as that of coolant and a circulating medium according to the second embodiment of the present invention. A most particular difference is that coolant flowing between the plurality of indoor units 200 and the outdoor units 100 passes through the coolant distributor 500, and the circulating medium (water) circulating between the outdoor heat exchanger 140 and the ground heat exchanger 300 passes through the circulating distributor 510.

First, flow of coolant and a circulating medium according to the second embodiment of the present invention will be described on the whole with reference to FIG. 4.

As described above, since the coolant distributor 500 for controlling flow of coolant is installed between the plurality of indoor units 200 and the outdoor units 100, coolant flowing between the indoor units 200 and the outdoor units 100 all passes through the coolant distributor 500.

In the case where the plurality of indoor units 200 perform the same function (e.g., cooling cycle), directions of coolant flowing through the plurality of indoor units 200 are all the same, and directions of coolant flowing through the plurality of outdoor units 100 are also all the same.

At this point, the coolant distributor 500 selectively opens/closes the branch liquid pipes 210' and the branch gas pipes 212' communicating with the plurality of indoor units 200 according to a command of the coolant control unit (not shown). That is, the coolant distributor 500 allows coolant to be supplied only to an indoor unit 200 that is in use, of the plurality of indoor units.

Also, the coolant distributor 500 controls coolant flowing to the plurality of outdoor units 100. That is, in the case where all of the indoor units 200 are operated and all of the outdoor units 100 need to be operated, the coolant distributor 500 opens all of the respective outdoor liquid pipes 210" and outdoor gas pipes 212" so that coolant is supplied to all the outdoor units 100. On the other hand, in the case where only some of the plurality of indoor units 200 are used or a load applied to the indoor unit 200 is small, the coolant distributor 500 closes the outdoor liquid pipes 210" and the outdoor gas pipes 212" connected to the some of the outdoor units 200 so that only some of the plurality of outdoor units 100 are used.

Meanwhile, since the circulation distributor 510 is installed between the outdoor heat exchangers 140 and the ground heat exchangers 300, the circulation distributor 510 controls flow of the circulating medium circulating through the plurality of outdoor heat exchangers 140 and ground heat exchangers 300.

For example, the circulation distributor 510 selectively opens/closes the respective outdoor circulating pipes 310' communicating with the plurality of outdoor heat exchangers 140 according to a command of the circulation control unit (not shown). That is, the circulation distributor 510 allows the circulating medium not to be supplied to the outdoor unit 100 of the plurality of outdoor units 100, that is not in use.

Also, the circulation distributor 510 controls the circulating medium supplied to the plurality of ground heat exchangers 300. That is, in the case where all of the outdoor units 100 are operated and all of the ground heat exchangers 300 need to be operated, the circulation distributor 510 opens all of the ground circulating pipes 310" so that coolant is supplied to all the ground heat exchangers 300. On the other hand, in the case where only some of the plurality of ground heat exchangers 300 can sufficiently process a load, the circulation distributor 510 closes some of the ground circulating pipes 310" so that the circulating medium is not supplied to the ground heat exchanger 300 that is not in use.

Meanwhile, coolant flowing through the indoor unit 200 and the outdoor unit 100 flows in opposite directions depending on cooling/heating cycles performed for indoor space. On the other hand, a direction of the circulating medium (water) flowing through the circulating pipe 310 is always constant and does not need to be switched in a reverse direction. That is, the circulating medium flowing through the circulating pipe 310 constantly flows in a direction illustrated by arrows in FIG. 4.

Flowing states of coolant contained in the outdoor units 100 and the indoor units 200 are the same as those of the first embodiment.

Figure 8:
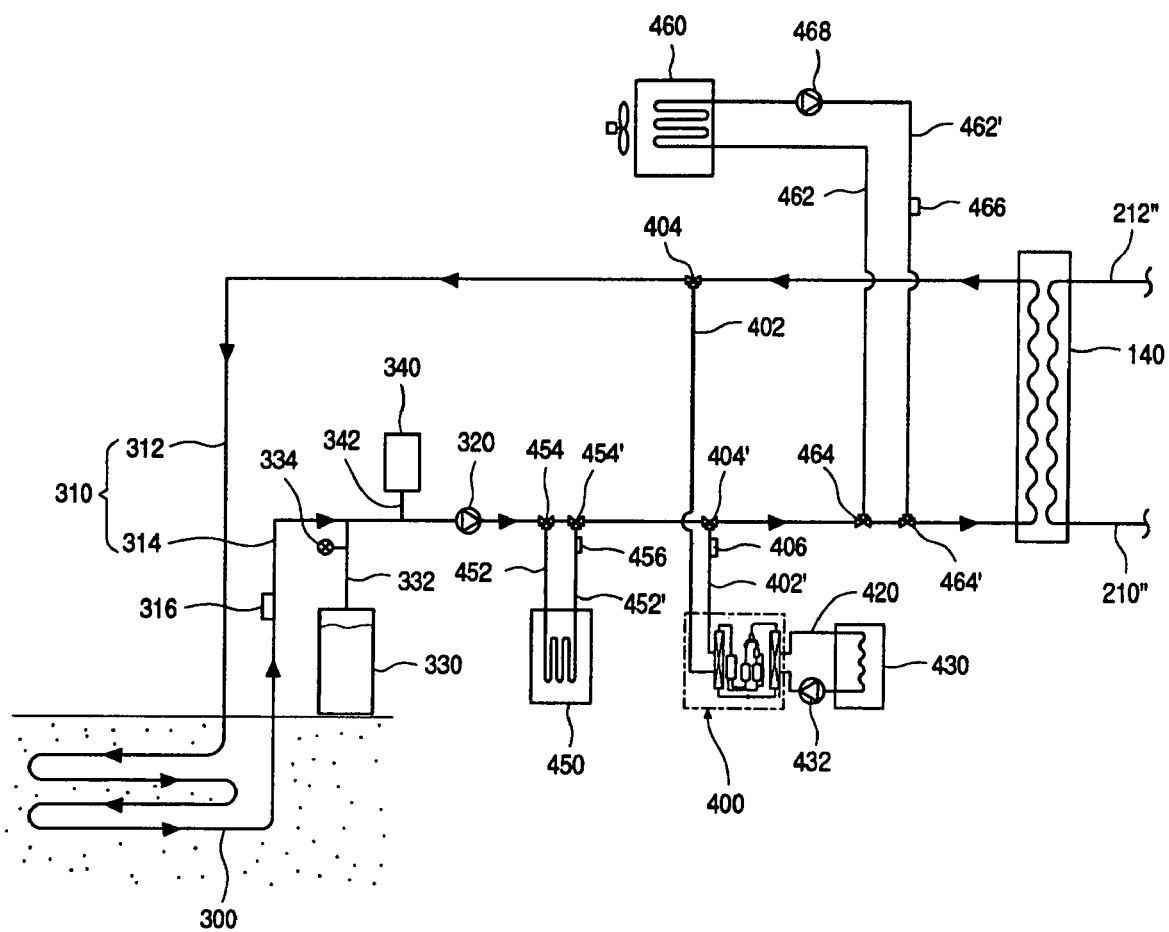
FIG. 8 is a view illustrating a circulating medium circulates through a circulating pipe in a geothermal air conditioning system according to the present invention.

FIG. 8 illustrates a circulating medium (water) flows through the circulating pipe 310, and is a basic circulation circuit of the case where a single ground heat exchanger 300 is used. That is, FIG. 8 illustrates the plurality of auxiliary heat sources 400, 450, and 460 are not used and the circulating medium (water) circulates between the outdoor heat exchanger 140 and the ground heat exchanger 300 in arrow directions.

At this point, flow of the circulating medium to the hot water heat pump 400, the boiler 450, and the cooling tower 460 is blocked by the heat pump supply pipe 402, the heat pump return pipe 402', the boiler supply valve 454, the boiler return valve 454', the cooling tower supply valve 464, and the cooling tower return valve 464'.

Therefore, the circulating medium flowing through the circulating pipe 310 circulates counterclockwise constantly as illustrated in arrows of FIG. 8. The flowing direction of the circulating medium maintains a constant direction regardless of cooling/heating cycles by the air conditioning system. That is, the circulating medium circulates in a constant direction regardless of whether the outdoor heat exchanger 140 serves as a condenser or an evaporator.

In the case where the outdoor heat exchanger 140 is used as a condenser (cooling cycle), the circulating medium flowing through the circulating pipe 310 cools down coolant at the outdoor heat exchanger 140. On the other hand, in the case where the outdoor heat exchanger 140 is used as an evaporator (heating cycle), the circulating medium flowing through the circulating pipe 310 heats coolant at the outdoor heat exchanger 140.

Also, when the circulating medium flowing through the circulating pipe 310 is insufficient, a user manually opens the supplementary valve 334 to supplement a circulating medium according to a signal of the control unit (not shown), or the supplementary valve 334 is automatically opened/closed under control of the control unit.

Also, the circulating pump 320 is driven using power applied from the outside to allow the circulating medium flowing through the circulating pipe 310 not to flow backward but to flow in one direction (counterclockwise direction in FIG. 8) constantly.

This circulation mechanism is a simplest mechanism used by a geothermal air conditioning system according to the present invention. When temperature of the circulating medium measured by the circulation temperature sensor 316 does not reach required temperature, the auxiliary heat sources 400, 450, and 460 are operated. That is, when temperature does not reach temperature sufficient to cool down or heat coolant at the outdoor heat exchanger 140, at least one of the auxiliary heat sources 400, 450, and 460 is operated to cool down or heat the circulating medium.

Figure 9:
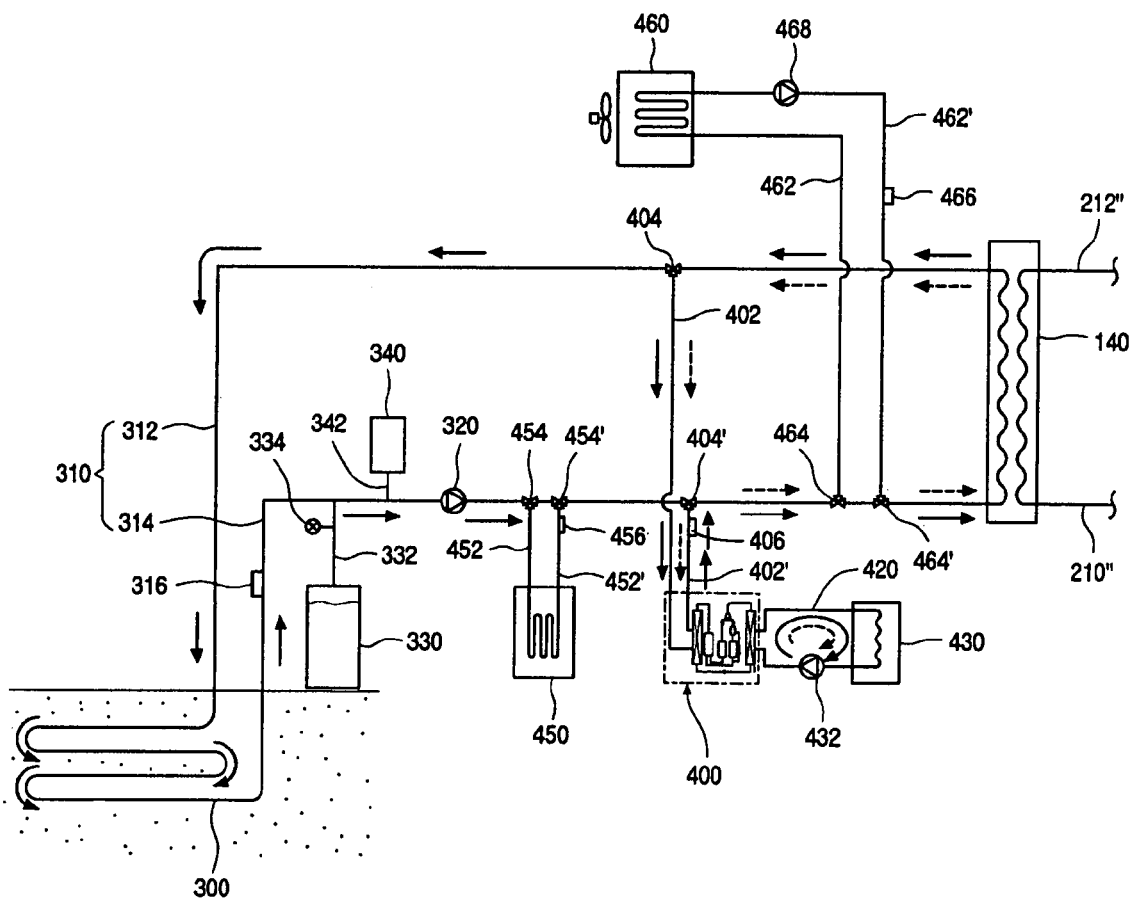
FIG. 9 is a view illustrating flow of a circulating medium when a hot water heat pump in a geothermal air conditioning system according to the present invention.

FIG. 9 illustrates flow of the circulating medium when the hot water heat pump 400 is operated. Referring to FIG. 9, the hot water heat pump 400 is primarily operated when an air conditioning system of the present invention operates in a cooling cycle.

First, a solid line arrow shows the case where a circulating medium is simultaneously supplied to both the ground heat exchanger 300 and the hot water heat pump 400. Therefore, at this point, the heat pump supply valve 404 is completely opened to allow a circulating medium coming from the outdoor heat exchanger 140 to flow into both the ground heat exchanger 300 and the hot water heat pump 400.

Also, at this point, since the hot water tank 430 operates, exchange water flows in an inside of the hot water circulating pipe 420. Therefore, heat exchange is performed even at the hot water condenser 412. That is, hot water coolant that passes through the hot water condenser 412 exchanges heat with the exchange water contained in the hot water circulating pipe 420, and is cooled down. Accordingly, water of the hot water tank 430 is heated by the heated exchange water to change into high temperature water.

Meanwhile, the circulating medium cooled down while it passes through the ground heat exchanger 300 and the hot water heat pump 400 joins again and flows into the outdoor heat exchanger 140. Also, the cooled down circulating medium and high temperature coolant exchange heat with each other at the outdoor heat exchanger 140, so that the coolant is cooled down and the circulating medium is heated.

Next, a dotted line arrow shows a circulating medium passes through only the hot water heat pump 400. That is, the circulating medium does not flow to the ground heat exchanger 300.

At this point, the heat pump supply valve 404 blocks a passage to the ground heat exchanger 300, and opens only a passage to the hot water heat pump 400 to control a circulating medium coming from the outdoor heat exchanger 140 to pass through only the hot water heat pump 400.

Also, at this point, since the hot water tank 430 operates as described, heat is exchanged between the circulating medium and hot water coolant at the hot water evaporator 410, and heat is exchanged between hot water coolant and exchange water at the hot water condenser 412. Therefore, the circulating medium is cooled down while it passes through the hot water heat pump 400. Circulation and heat exchange of hot water coolant performed inside the hot water heat pump 400 will be described below in detail.

Temperature of a circulating medium discharged after passing through the hot water heat pump 400 is measured by the hot water temperature sensor 406, and the measured temperature is delivered to the control unit (not shown). Therefore, the control unit judges whether temperature of the circulating medium coming from the hot water heat pump 400 is sufficient temperature for cooling down coolant at the outdoor heat exchanger 140 to determine whether to operate other auxiliary heat source (cooling tower).

For example, when temperature of the circulating medium coming from the hot water heat pump 400 is greater than critical cooling temperature of coolant that should be cooled down at the outdoor heat exchanger 140, the control unit controls the circulating medium to pass through the cooling tower 460 to cool down the circulating medium even more. Here, the critical cooling temperature is temperature set to an upper limit required for condensing gas coolant at the outdoor heat exchanger 140 during a cooling cycle of the air conditioning system.

Also, a process by which a circulating medium that has flowed into the outdoor heat exchanger 140 to exchange heat with coolant is the same as that described above.

Figure 10:
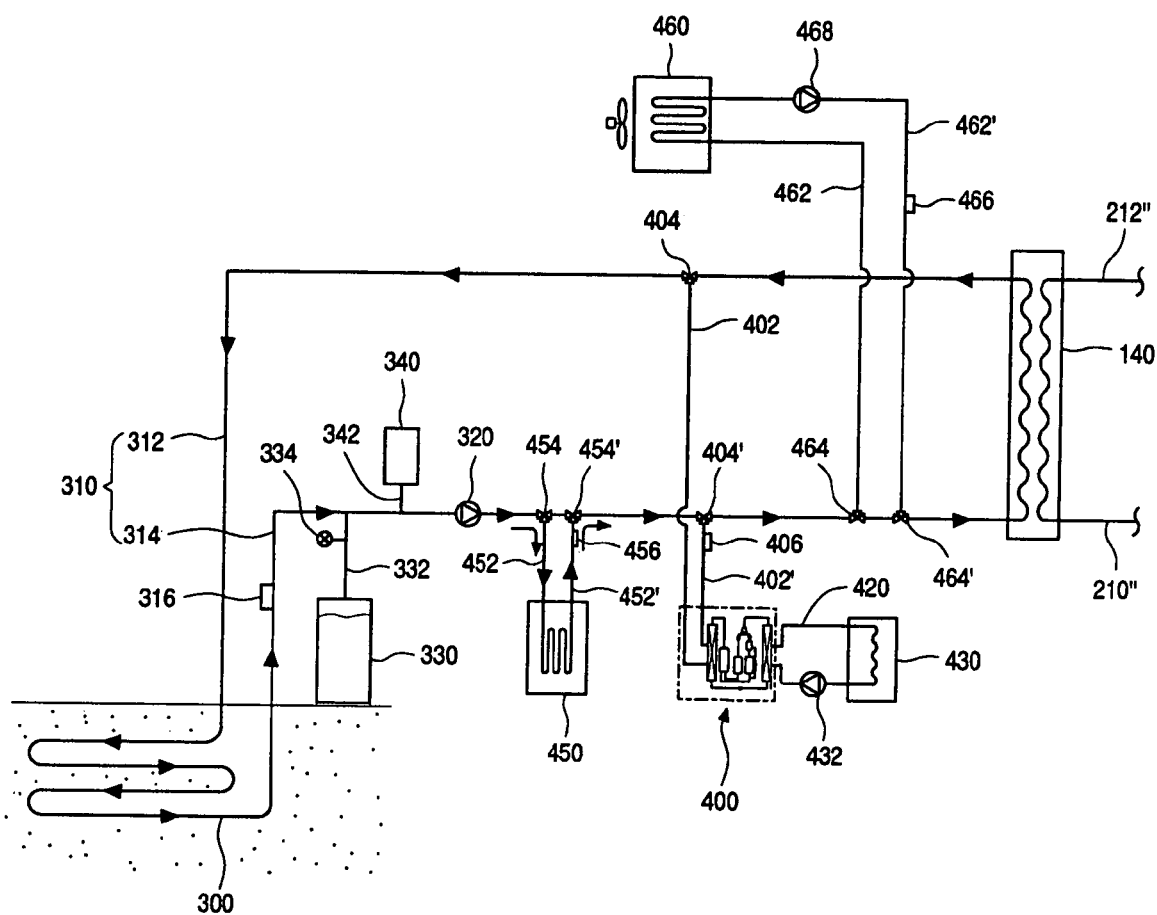
FIG. 10 is a view illustrating flow of a circulating medium when a boiler operates according to an embodiment of the present invention.

FIG. 10 exemplarily illustrates the boiler 450 operates. That is, the boiler 450 operates in order to raise temperature of the circulating medium coming from the ground heat exchanger 300. At this point, the air conditioning system according to the present invention operates in a heating cycle to heat indoor space.

As illustrated in FIG. 10, the boiler 450 operates in the case where temperature measured by the circulation temperature sensor 316 is not sufficiently high to heat coolant at the outdoor heat exchanger 140, or in the case where a user intends to double heating ability of the air conditioning system. That is, the boiler 450 is used in the case where temperature of the circulating medium that has passed through the ground heat exchanger 300 is lower than critical heating temperature of coolant flowing into the outdoor heat exchanger 140, or in the case where a user wants strong heating. Here, the critical heating temperature is temperature set to a lower limit required for evaporating liquid coolant at the outdoor heat exchanger 140 during a heating cycle of the air conditioning system.

Referring to FIG. 10, in this case, the boiler supply valve 454 opens a passage of the boiler 450 to allow a circulating medium coming from the ground heat exchanger 300 to pass through the boiler 450.

In more detail, the control unit (not shown) blocks a right passage of the boiler supply valve 454 and simultaneously opens a lower passage of the boiler supply valve 454 to allow the circulating medium that has passed through the ground heat exchanger 300 to flow into the boiler 450 in the case where the temperature of the circulating medium measured by the circulation temperature sensor 316 is lower than the critical heating temperature. Also, simultaneously, a lower passage of the boiler return valve 454' is opened.

Also, at this point, flow of a circulating medium to the hot water heat pump 400 and the cooling tower 460 is blocked by the heat pump supply pipe 402, the heat pump return pipe 402', the cooling tower supply valve 464, and the cooling tower return valve 464'.

The boiler 450 is heated by external power or energy to increase temperature of the circulating medium. Temperature of the circulating medium that has passed through the boiler 450 is measured by the boiler temperature sensor 456 and delivered to the control unit. Therefore, the control unit controls a level of heating the circulating medium at the boiler 450 depending on the temperature delivered from the boiler temperature sensor 456. Therefore, temperature of the circulating medium measured at the boiler temperature sensor 456 should be greater than the critical heating temperature.

A circulating medium sufficiently heated (to the critical heating temperature or more) while it passes through the boiler 450 flows into the outdoor heat exchanger 140 to exchange heat with coolant that is to flow into the indoor unit 200. Therefore, the circulating medium is cooled down and the coolant is heated.

Figure 11:
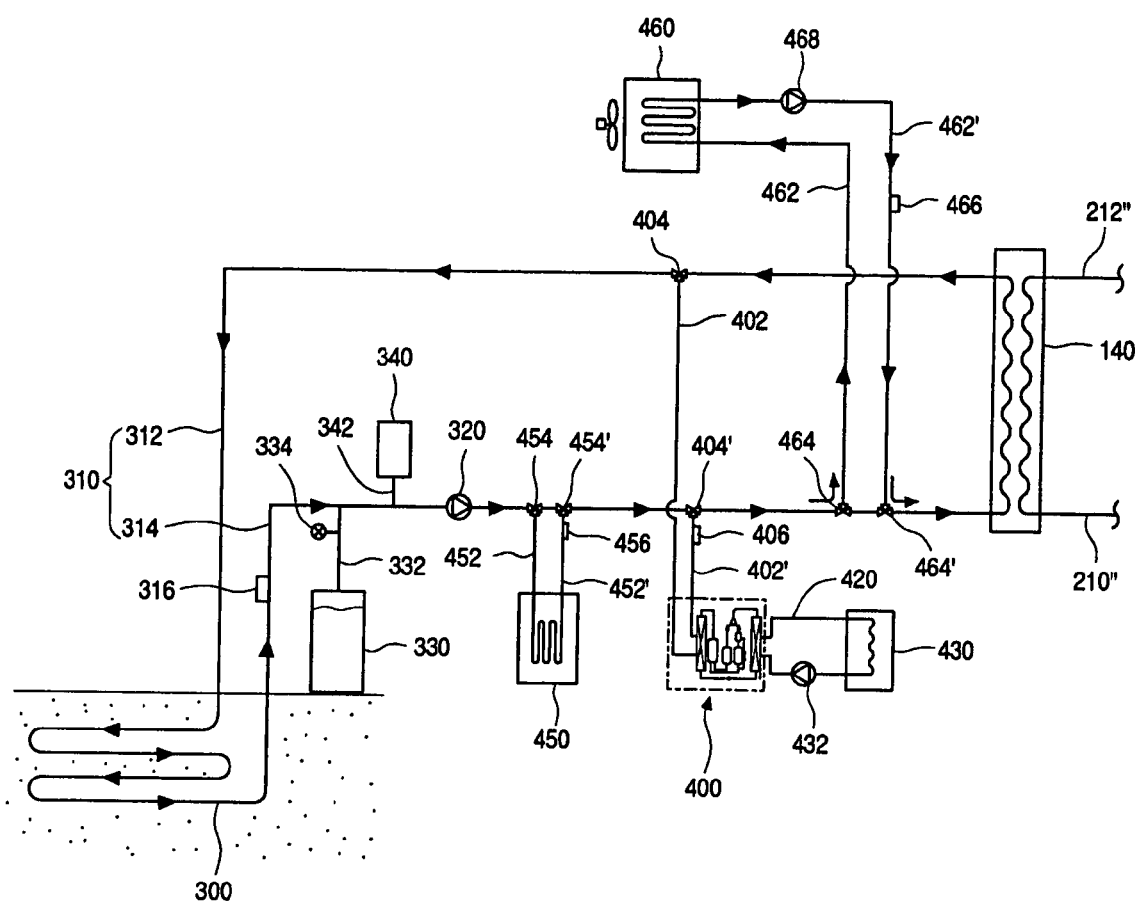
FIG. 11 is a view illustrating flow of a circulating medium when a cooling tower operates according to an embodiment of the present invention.

FIG. 11 illustrates the cooling tower 460 is used as an auxiliary heat source. A circulating medium is cooled down while it passes through the cooling tower 460 when the air conditioning system according to the present invention operates in a cooling cycle. That is, the cooling tower 460 is used in the case where temperature of the circulating medium that has exchanged heat at the ground heat exchanger 300 is greater than the critical cooling temperature of coolant that is to exchange heat at the outdoor heat exchanger 140, or in the case where a user intends to improve a cooling ability of the air conditioning system even more.

In more detail, the control unit controls an upper passage of the cooling tower supply valve 464 to be opened and controls a right passage of the cooling tower supply valve 464 to be closed, and simultaneously, controls an upper passage of the cooling tower return valve 464' to be opened in the case where temperature of the circulating medium detected by the circulation temperature sensor 316 does not reach the critical cooling temperature.

Accordingly, a passage to the cooling tower 460 is opened and the circulating medium that has passed through the ground heat exchanger 300 flows into the cooling tower 460 via the cooling tower supply pipe 462 and is cooled down. Also, the circulating medium cooled down at the cooling tower 460 is flowed to the cooling tower return pipe 462' by the cooling pump 468, and subsequently, flows into the outdoor heat exchanger 140. At this point, temperature of the circulating medium measured by the cooling temperature sensor 466 should be maintained lower than the critical cooling temperature.

A low temperature circulating medium that has flowed into the outdoor heat exchanger 140 exchanges heat with high temperature coolant. Therefore, the circulating medium is changed into a high temperature circulating medium by heat exchange. The coolant is changed into low temperature coolant by heat exchange and flows into the indoor unit 200 to cool down an indoor space (a space for air conditioning).

In the geothermal air conditioning system according to the present invention, the control unit operates the plurality of auxiliary heat sources 400, 450, and 460 on the basis of temperature measured by the circulation temperature sensor 316. That is, the control unit selectively or simultaneously operates the hot water heat pump 400 or the cooling tower 460 when the circulating medium that has passed through the ground heat exchanger 300 needs to be further cooled down even more during a cooling cycle. Also, the control unit controls the circulating medium to pass through the boiler 450 when the circulating medium that has passed through the ground heat exchanger 300 needs to be further heated.

Meanwhile, all of the plurality of indoor units 200 can be uniformly used for cooling or heating an indoor space. Besides, the plurality of indoor units 200 can be operated to simultaneously perform a cooling cycle and a heating cycle. That is, some of the indoor units 200 can be operated for a heating cycle, and some of the indoor units 200 can be operated for a cooling cycle.

Figure 12:
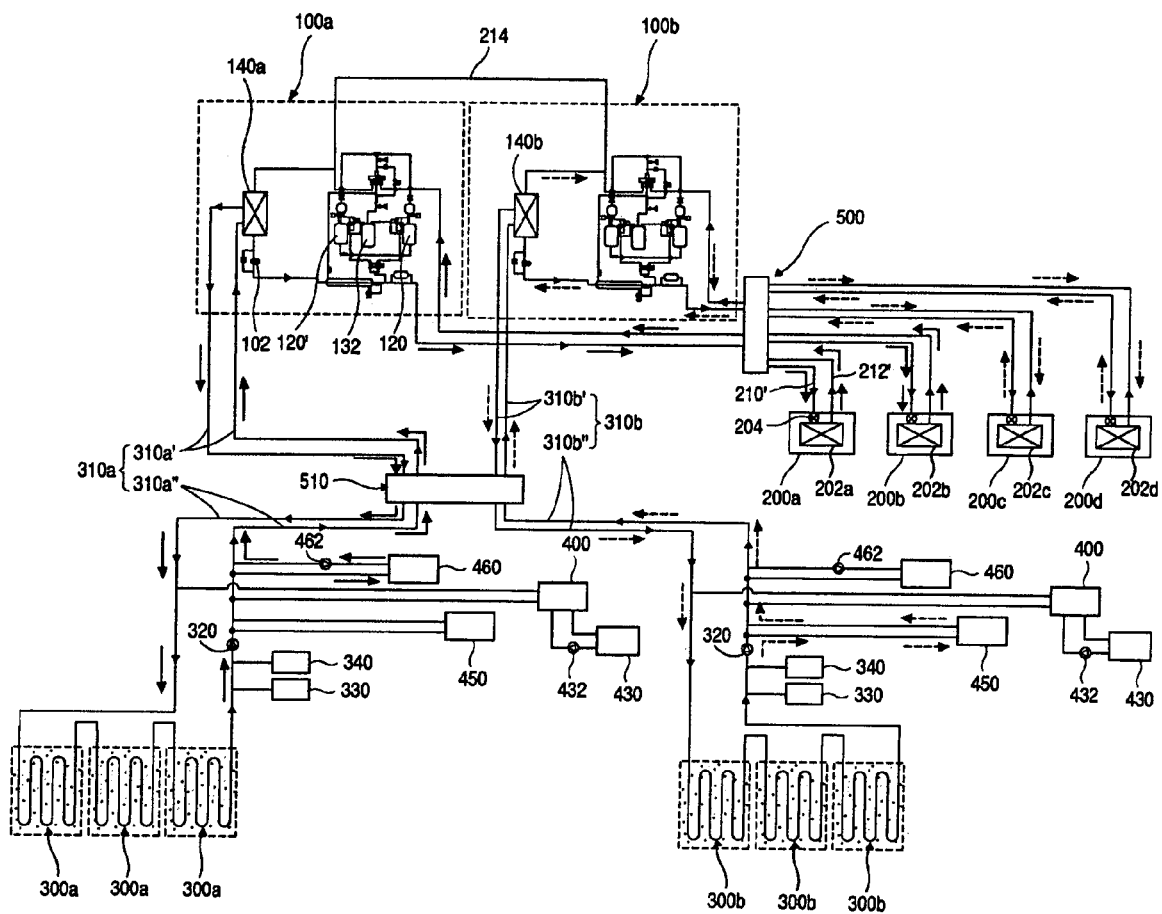
FIG. 12 is a view illustrating flow of coolant and a circulating medium when partial cooling and partial heating are performed according to a second embodiment of the present invention.
Figure 13:
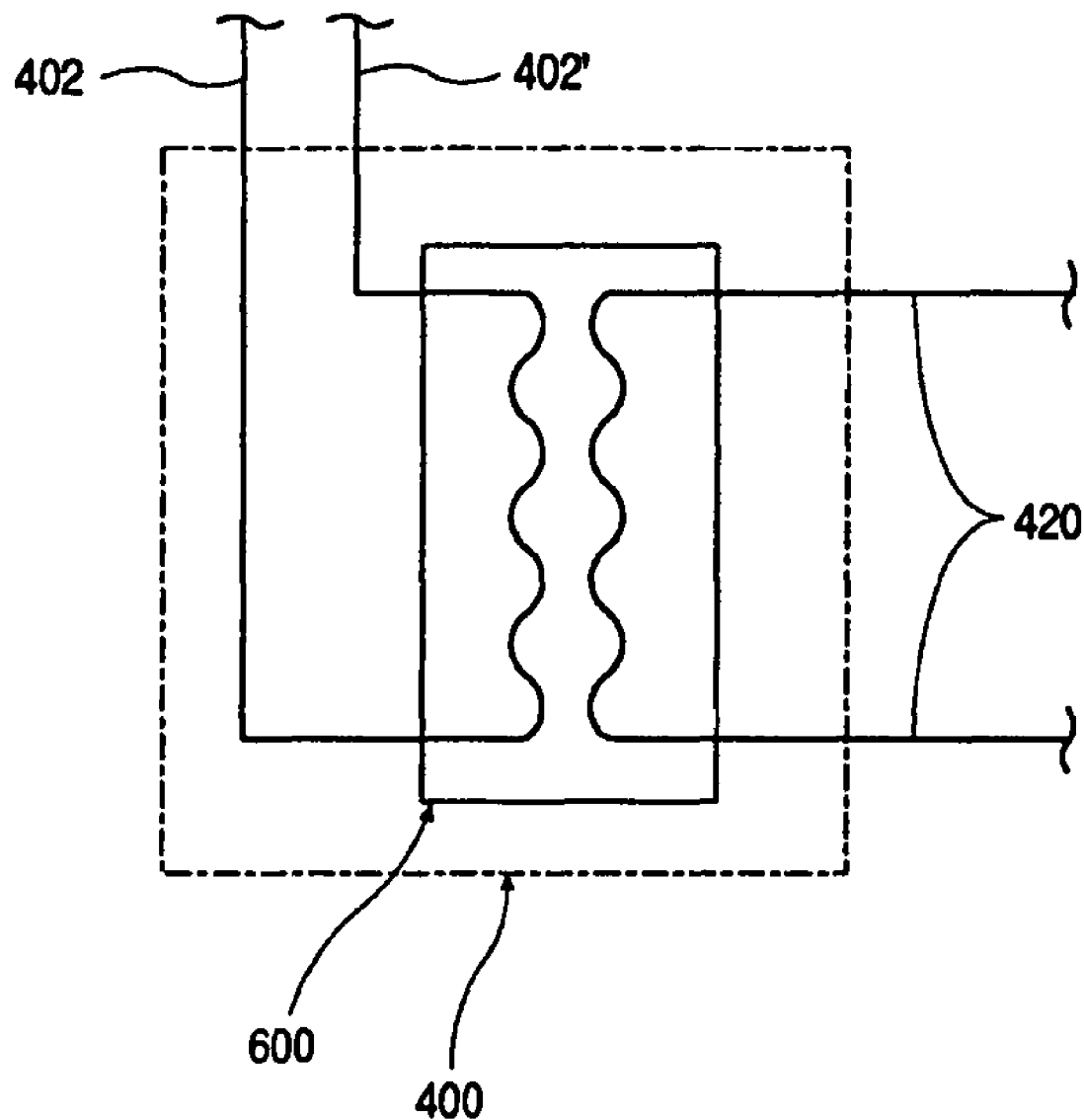
FIG. 13 is a view illustrating an inner construction of a hot water heat pump.

FIG. 12 exemplarily illustrates some of the indoor units are operated for a heating cycle, and some of the indoor units are operated for a cooling cycle. That is, a first indoor unit 200a and a second indoor unit 200b of indoor units illustrated in FIG. 12 are operated for a cooling cycle. A third indoor unit 200c and a fourth indoor unit 200d of the indoor units illustrated in FIG. 12 are operated for a heating cycle. A solid line of FIG. 12 shows flow of coolant and a circulating medium for a cooling cycle, and a dotted line of FIG. 13 shows flow of coolant and a circulating medium for a heating cycle.

At this point, a first outdoor unit 100a of the plurality of outdoor units is used for a cooling cycle of the first indoor unit 200a and the second indoor unit 200b. A second outdoor unit 100b of the plurality of outdoor units is used for a heating cycle of the third indoor unit 200c and the fourth indoor unit 200d.

First, cooling a space (an indoor space) for air conditioning will be described.

Coolant that has passed through the first indoor unit 200a and the second indoor unit 200b joins at the coolant distributor 500, and flows into the first outdoor unit 100a. The coolant that has flowed into the first outdoor unit 100a flows into a first outdoor heat exchanger 140a to exchange heat with a circulating medium. At this point, the coolant is cooled down and condensed by the circulating medium.

The coolant condensed by the first outdoor heat exchanger 140a flows into the coolant distributor 500 again, and is distributed and supplied to the first indoor unit 200a and the second indoor unit 200b. The coolant that has flowed into the first indoor unit 200a and the second indoor unit 200b exchanges heat with air contained in an indoor space, and is evaporated (heated) at a first indoor heat exchanger 202a and a second indoor heat exchanger 202b. Therefore, the coolant emits cooling air to cool down the space for air conditioning (a first indoor space in which the first indoor unit is installed, and a second indoor space in which the second indoor unit is installed) during above process.

Also, a circulating medium that has exchanged heat with coolant at the first outdoor heat exchanger 140a flows into a plurality of first ground heat exchangers 300a along a first circulating pipe 310a. In more detail, the circulating medium that has passed through the first outdoor heat exchanger 140a is guided along a first outdoor circulating pipe 310a', flows into the circulating distributor 510, passes through the circulating distributor 510, and is guided along a first ground circulating pipe 310a" and flows into the plurality of first ground heat exchangers 300a.

The circulating medium that has flowed into the first ground heat exchanger 300a is cooled down by emitting heat to the ground, and flows into the cooling tower 460. The circulating medium is cooled down even more by external air. The circulating medium that has passed through the cooling tower 460 flows along the first ground circulating pipe 310a", passes through the circulation distributor 510, flows along the first outdoor circulating pipe 310a', and flows into the first outdoor heat exchanger 140a again.

Therefore, a low temperature circulating medium that has flowed into the first outdoor heat exchanger 140a cools down coolant that passes through the first outdoor heat exchanger 140a, and the low temperature circulating medium itself is heated. Though the above-described processes, the circulating medium circulates through a complete one cycle.

Next, heating a space for air conditioning will be described.

Coolant that has passed through the third indoor unit 200c and the fourth indoor unit 200d joins at the coolant distributor 500, and flows into the second outdoor unit 100b. The coolant that has flowed into the second outdoor unit 100b flows into a second outdoor heat exchanger 140b to exchange heat with a circulating medium. At this point, the coolant is heated and evaporated by the circulating medium.

The coolant evaporated (heated) by the second outdoor heat exchanger 140b flows into the coolant distributor 500 again, and is distributed and supplied to the third indoor unit 200c and the fourth indoor unit 200d. The coolant that has flowed into the third indoor unit 200c and the fourth indoor unit 200d exchanges heat with air contained in an indoor space, and is evaporated (heated) at a third indoor heat exchanger 202c and a fourth indoor heat exchanger 202d. Therefore, the coolant emits hot air to heat the space for air conditioning (a third indoor space in which the third indoor unit is installed, and a fourth indoor space in which the fourth indoor unit is installed) during above process.

Also, a circulating medium that has exchanged heat with coolant at the second outdoor heat exchanger 140b flows into a plurality of second ground heat exchangers 300b along a second circulating pipe 310b. In more detail, the circulating medium that has passed through the second outdoor heat exchanger 140b is guided along a second outdoor circulating pipe 310b', flows into the circulating distributor 510, passes through the circulating distributor 510, and is guided along a second ground circulating pipe 310b", and flows into the plurality of second ground heat exchangers 300b.

The circulating medium that has flowed into the second ground heat exchanger 300b is heated by receiving heat from the ground, and flows into the boiler 450. The circulating medium is heated even more at the boiler 450 and changed into a high temperature circulating medium. The high temperature circulating medium that has passed through the boiler 450 passes through the circulation distributor 510, flows along the second outdoor circulating pipe 310b', and flows into the second outdoor heat exchanger 140b again.

Therefore, the high temperature circulating medium that has flowed into the second outdoor heat exchanger 140b heats coolant that passes through the second outdoor heat exchanger 140b, and the high temperature circulating medium itself is cooled down. Though the above-described processes, the circulating medium circulates through another complete cycle.

As described above, according to the present invention, not only all of the plurality of indoor units 200 can be operated for a cooling cycle or a heating cycle, but also some of the plurality of indoor units 200 are operated for a heating cycle, and also some of the plurality of indoor units 200 are operated for a cooling cycle.

Also, the above-described partial cooling cycle and partial heating cycle can be performed by a user's selection/control, and can be automatically performed under control of the control unit (not shown).

That is, the control unit (not shown) determines whether to heat or cool down respective spaces (indoor spaces) for air conditioning according to a signal delivered from sensors (e.g., temperature sensors) installed at the indoor spaces. Coolant flowing into the plurality of indoor units 200 is individually controlled in response to a control signal from the control unit. Also, all or some of the plurality of outdoor units 100 and the ground heat exchangers 300 are selectively used depending on a load.

It will be apparent to those skilled in the art that various modifications and variations can be made in the present invention. Thus, it is intended that the present invention covers the modifications and variations of this invention provided they come within the scope of the appended claims and their equivalents.

For example, the number of the ground heat exchangers 300 described or illustrated in the above respective embodiments can be modified in various ways.

That is, though one ground heat exchanger 300 is used according to the first embodiment, two or more ground heat exchangers 300 can be installed in parallel or in series.

Also, the number of the ground heat exchangers 300 illustrated in FIG. 3 or 4 is not limited also in the second embodiment, but a various number of ground heat exchangers 300 can be connected and installed, and a separate ground distributor can be further provided so that the plurality of ground heat exchangers 300 can be selectively used when needed.

Meanwhile, the hot water heat pump 400 can have a simple inner construction as illustrated in FIG. 13. That is, one hot water heat exchanger 600 is installed inside the hot water heat pump 400, the heat pump supply pipe 402, and the heat pump return pipe 402' are connected at a left side of the hot water heat exchanger 600 to guide the circulating medium (water) as illustrated.

Also, the hot water circulating pipe 420 is connected to a right side of the hot water heat exchanger 600 to guide flow of exchange water. Therefore, the exchange water flowing through the hot water tank 430 exchanges heat with the circulating medium flowing through the heat pump supply pipe 402 and the heat pump return pipe 402' at the hot water heat exchanger 600.140

What is claimed is:

1. An air conditioning system using ground heat, the system comprising:
at least one indoor unit for conditioning indoor air;
at least one outdoor unit communicating with the at least one indoor unit and including an outdoor heat exchanger where heat exchange occurs;
a plurality of pipes installed between the at least one indoor unit and the at least one outdoor unit to guide flowing of a coolant;
a coolant distributor installed between the plurality of pipes, the coolant distributor configured to control coolant supplied to the at least one indoor unit or the at least one outdoor unit;
a ground heat exchanger provided at one side of the outdoor heat exchanger of the at least one outdoor unit, and laid under the ground to allow heat to be exchanged between ground heat and a circulating medium circulating through the ground heat exchanger;
a circulating pipe configured to connect the outdoor heat exchanger with the ground heat exchanger to guide circulation of the circulating medium; and a plurality of auxiliary heat sources installed on the circulating pipe to heat or cool down the circulating medium, wherein two or more auxiliary heat sources of the plurality of auxiliary heat sources are simultaneously used, or one of them is selectively used, wherein the circulating medium that flows through the ground heat exchanger is introduced into the one of the plurality of auxiliary heat sources.

2. The system according to claim 1, wherein the plurality of auxiliary heat sources are apparatuses for heating or cooling down the circulating medium circulating through the ground heat exchanger.

3. The system according to claim 2, wherein the plurality of auxiliary heat sources comprise two or more selected from the group consisting of:

a hot water heat pump installed between the at least one outdoor unit and the ground heat exchanger, and including a heat exchanger therein to allow the circulating medium circulating through the ground heat exchanger to emit hot air through heat exchange with exchange water;

a boiler installed between the at least one outdoor unit and the ground heat exchanger to heat the circulating medium circulating through the ground heat exchanger; and a cooling tower installed between the at least one outdoor unit and the ground heat exchanger to cool down the circulating medium circulating through the ground heat exchanger.

4. The system according to claim 3, wherein the circulating medium is water ($H_2O$).

5. The system according to claim 3, wherein a hot water tank for heating and storing water is further provided on one side of the hot water heat pump.

6. The system according to claim 5, wherein a hot water circulating pipe through which exchange water flows is connected between the hot water heat pump and the hot water tank.

7. The system according to claim 6, wherein the hot water heat exchanger allows heat to be exchanged between the circulating medium and the exchange water is provided at the hot water heat pump.

8. The system according to claim 1, wherein a circulating pump for forcing flowing of the circulating medium in the ground heat exchanger is installed at the circulating pipe.

9. The system according to claim 1, wherein a supplementary tank for supplementing a shortage of the circulating medium flowing through the circulating pipe is further provided on one side of the circulating pipe.

10. The system according to claim 1, wherein a conservation tank for controlling pressure of the circulating medium flowing through the circulating pipe is further provided on one side of the circulating pipe.

11. The system according to claim 1, wherein the outdoor heat exchanger comprises a plate-type heat exchanger formed by stacking a plurality of thin plates and allowing coolant and a circulating medium to flow to intersect each other.

* * * * *